United States Patent
Izadian et al.

(10) Patent No.: US 11,644,533 B2
(45) Date of Patent: May 9, 2023

(54) MULTIPLE POLARIZATION RADAR UNIT

(71) Applicant: Waymo LLC, Mountain View, CA (US)

(72) Inventors: Jamal Izadian, Mountain View, CA (US); Philip Ma, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 240 days.

(21) Appl. No.: 16/951,574

(22) Filed: Nov. 18, 2020

(65) Prior Publication Data

US 2021/0072344 A1    Mar. 11, 2021

Related U.S. Application Data

(63) Continuation of application No. 15/848,205, filed on Dec. 20, 2017, now Pat. No. 10,852,390.

(51) Int. Cl.
*G01S 7/02*          (2006.01)
*G01S 7/41*          (2006.01)
(Continued)

(52) U.S. Cl.
CPC ............... *G01S 7/025* (2013.01); *G01S 7/41* (2013.01); *G01S 13/931* (2013.01); *G01S 13/951* (2013.01); *H01Q 21/00* (2013.01)

(58) Field of Classification Search
CPC . G01S 7/024; G01S 7/025; G01S 7/41; G01S 13/931; G01S 13/951; H01Q 21/00
See application file for complete search history.

(56) References Cited

U.S. PATENT DOCUMENTS 3,568,190 A * 3/1971 Wong ................... G01S 13/4409
342/149
3,716,856 A * 2/1973 Beguin ................... H01Q 15/22
342/171
(Continued)

FOREIGN PATENT DOCUMENTS

JP      H04122874 A    4/1992
JP      H08194055 A    7/1996
(Continued)

OTHER PUBLICATIONS

International Search Report and Written Opinion issued in corresponding PCT Application No. PCT/US2018/062249, ISA/KR, Korean Patent Office, dated Mar. 22, 2019, 10 pages*.

(Continued)

*Primary Examiner* — Peter M Bythrow
(74) *Attorney, Agent, or Firm* — McDonnell Boehnen Hulbert & Berghoff LLP

(57) ABSTRACT

Example embodiments present radar units capable of operating in multiple polarizations. An example radar unit may include a set of transmission antennas and a set of reception antennas. Particularly, the transmission antennas may each be configured to transmit radar signals that radiate in one or more of four potential polarizations. The four polarizations can correspond to horizontal linear, vertical linear and slanted polarizations at approximately positive forty-five degrees and negative forty-five degrees from the horizontal plane. As such, the reception antennas of the radar unit may each be configured to receive reflected radar signals that are radiating in one of the four potential polarizations. The radar unit may further include an amplifier configured to cause one or multiple transmission antennas to selectively transmit between two or more of the four polarization channels.

18 Claims, 15 Drawing Sheets

(51) Int. Cl.
*G01S 13/95* (2006.01)
*H01Q 21/00* (2006.01)
*G01S 13/931* (2020.01)

(56) References Cited

U.S. PATENT DOCUMENTS

| | | | | |
|---|---|---|---|---|
| 4,197,541 | A * | 4/1980 | Nemit | G01S 7/024 342/361 |
| 5,038,150 | A * | 8/1991 | Bains | H01Q 25/001 342/373 |
| 5,329,285 | A * | 7/1994 | McCandless | G01S 13/4409 342/153 |
| 5,337,058 | A * | 8/1994 | Cross | G01S 7/024 343/756 |
| 5,659,322 | A * | 8/1997 | Caille | H01Q 21/245 342/188 |
| 6,201,508 | B1 * | 3/2001 | Metzen | H01Q 13/0258 343/778 |
| 6,545,647 | B1 * | 4/2003 | Sievenpiper | H01Q 21/26 343/756 |
| 6,657,577 | B1 * | 12/2003 | Gregersen | G01V 3/12 343/793 |
| 6,724,341 | B1 * | 4/2004 | Pereira | F41G 7/34 244/3.1 |
| 6,731,241 | B2 * | 5/2004 | Park | H01Q 21/0006 342/361 |
| 7,834,803 | B2 * | 11/2010 | Weinstein | H01Q 25/02 342/149 |
| 8,098,189 | B1 * | 1/2012 | Woodell | G01S 7/025 342/26 B |
| 8,264,398 | B2 * | 9/2012 | Kamo | G01S 13/955 342/175 |
| 9,103,906 | B2 | 8/2015 | Choi | |
| 9,391,375 | B1 * | 7/2016 | Bales | H01Q 21/064 |
| 9,929,886 | B2 * | 3/2018 | Amadjikpe | H01Q 21/065 |
| 10,168,419 | B2 | 1/2019 | Trummer | |
| 10,809,375 | B1 * | 10/2020 | Dana | G01S 13/953 |
| 2007/0241962 | A1 * | 10/2007 | Shinoda | H01Q 1/425 342/361 |
| 2009/0102704 | A1 * | 4/2009 | Fujimura | H01Q 21/24 342/25 R |
| 2009/0174596 | A1 * | 7/2009 | Gekat | G01S 7/024 342/26 R |
| 2009/0251362 | A1 * | 10/2009 | Margomenos | G01S 13/931 342/175 |
| 2011/0090129 | A1 * | 4/2011 | Weily | H01Q 21/064 343/770 |
| 2011/0102238 | A1 * | 5/2011 | Kamo | G01S 7/025 342/70 |
| 2012/0007771 | A1 * | 1/2012 | Miyagawa | H01Q 21/005 342/175 |
| 2012/0235857 | A1 * | 9/2012 | Kim | G01S 13/931 342/134 |
| 2012/0256786 | A1 * | 10/2012 | Bowring | G01S 7/025 342/188 |
| 2016/0047893 | A1 * | 2/2016 | Izadian | H04B 7/0617 342/368 |
| 2016/0047907 | A1 * | 2/2016 | Izadian | H01Q 3/2605 342/368 |
| 2016/0054439 | A1 * | 2/2016 | Brookner | G01S 13/91 342/36 |
| 2016/0195607 | A1 * | 7/2016 | Roulston | G01S 13/106 342/201 |
| 2016/0195612 | A1 * | 7/2016 | Shi | H01Q 25/00 342/27 |
| 2017/0098892 | A1 * | 4/2017 | Kim | H01Q 13/06 |
| 2017/0176350 | A1 * | 6/2017 | Guy | G01S 7/411 |
| 2017/0299708 | A1 * | 10/2017 | Cho | G01S 7/038 |
| 2017/0353338 | A1 * | 12/2017 | Amadjikpe | H01Q 21/065 |
| 2017/0373403 | A1 * | 12/2017 | Watson | H01Q 9/04 |
| 2018/0066991 | A1 * | 3/2018 | Mueller | H01Q 21/24 |
| 2019/0190133 | A1 * | 6/2019 | Izadian | H01Q 21/064 |
| 2021/0151901 | A1 * | 5/2021 | Milroy | H01Q 21/24 |
| 2022/0221554 | A1 * | 7/2022 | Kawaji | G01S 13/345 |

FOREIGN PATENT DOCUMENTS

| | | |
|---|---|---|
| JP | 2010014533 | 1/2010 |
| JP | 2013224893 A | 10/2013 |
| JP | 2015190809 A | 11/2015 |
| JP | 2016516983 A | 6/2016 |

OTHER PUBLICATIONS

Caili Guo, et al., "Advances on Exploiting Polarization in Wireless Communications: Channels, Technologies, and Applications," IEEE Communications Surveys &Tutorials, vol. 19, No. 1, First Quarter 2017.

* cited by examiner

MULTIPLE POLARIZATION RADAR UNIT

CROSS REFERENCE TO RELATED APPLICATION

The present patent application is a continuation of U.S. patent application Ser. No. 15/848,205, filed on Dec. 20, 2017, which is hereby incorporated by reference in its entirety.

BACKGROUND

Radio detection and ranging (RADAR) systems can actively estimate distances to features in the environment by emitting radio signals and detecting returning reflected signals that reflect off surfaces in the environment. As a result, distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate.

Some systems may also estimate relative motion of reflective objects based on Doppler frequency shifts in the received reflected signals. Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be identified and/or mapped.

Some example automotive radar systems may be configured to operate with frequencies in the IEEE W band (75-110 Gigahertz (GHz)) and/or the NATO M band (60-100 GHz). In one example, the present system may operate at an electromagnetic wave frequency of 77 GHz, which corresponds to millimeter (mm) electromagnetic wavelength (e.g., 3.9 mm for 77 GHz). These radar systems may use antennas that can focus the radiated energy into beams in order to enable the radar system to measure an environment with high accuracy, such as the surrounding environment around an autonomous vehicle.

SUMMARY

In one aspect, the present application describes a radar unit. The radar unit includes a plurality of transmission antennas. Particularly, the plurality of transmission antennas includes respective transmission antennas configured to transmit in one of four polarizations. The radar unit further includes a plurality of reception antennas. The plurality of reception antennas includes respective reception antennas configured to receive radar signals from one of the four polarizations.

In another aspect, the present application describes a radar system. The radar system includes a plurality of transmission antennas. The plurality of transmission antennas includes a first transmission antenna configured to transmit in a horizontal linear polarization, a second transmission antenna configured to transmit in a vertical horizontal linear polarization, and a third transmission antenna configured to selectively transmit in between a first slanted polarization at approximately positive forty-five degrees from a horizontal plane and a second slanted polarization configured to radiate at approximate negative forty-five degrees from the horizontal plane. The radar system further includes a plurality of reception antennas. The plurality of reception antennas includes a first reception antenna configured to receive reflections of radar signals transmitted in the horizontal linear polarization, a second reception antenna configured to receive reflections of radar signals transmitted in the vertical horizontal linear polarization, a third reception antenna configured to receive reflections of radar signals transmitted in the first slanted counter-clockwise polarization and a fourth reception antenna configured to receive reflections of radar signals transmitted in the second slanted polarization.

In yet another aspect, the present application describes a method of signaling with a radar system. The method involves transmitting a radar signal using a plurality of transmission antennas. Particularly, the plurality of transmission antennas includes respective transmission antennas configured to transmit in one of four polarizations. The method also involves receiving the radar signal using a plurality of reception antennas. The plurality of reception antennas includes respective reception antennas configured to receive radar signals from one of the four polarizations.

In a further aspect, the present application describes a system with means for signaling with a radar system. The system may include means for transmitting a radar signal using a plurality of transmission antennas. Particularly, the plurality of transmission antennas includes respective transmission antennas configured to transmit in one of four polarizations. The system may also include means for receiving the radar signal using a plurality of reception antennas. The plurality of reception antennas includes respective reception antennas configured to receive radar signals from one of the four polarizations.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
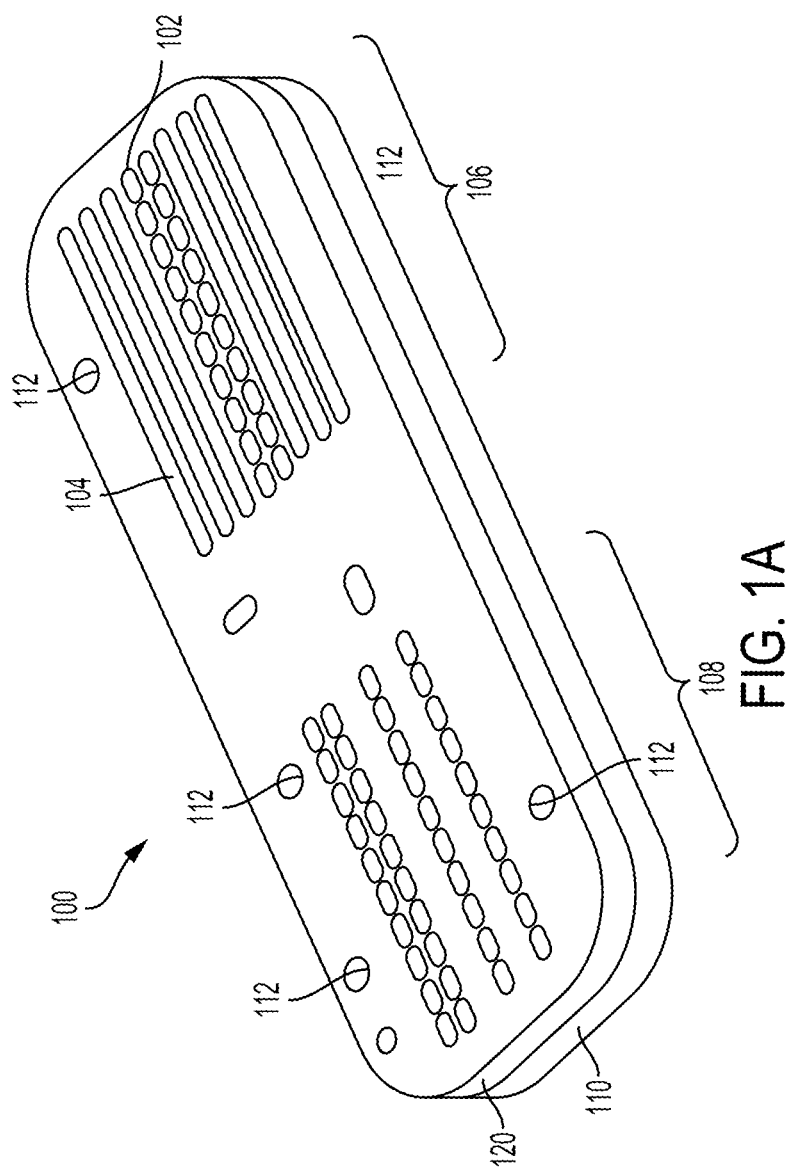
FIG. 1A illustrates an assembled view of the top of a radar unit, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can use one or multiple transmission antennas to emit radar signals in predetermined directions to measure aspects of the environment. Upon coming into contact with surfaces in the environment, the radar signals can reflect or scatter in multiple directions with some of the radar signals penetrating into surfaces to some degree. Other radar signals, however, reflect back towards the radar system and are captured by one or multiple reception antennas. Received reflected signals can be processed to determine locations of surfaces relative to the radar system as well as other aspects of the environment (e.g., movement of objects in the environment).

Due to the ability to measure distances to features as well as motion of moving features within an environment, radar systems are increasingly used to assist with vehicle navigation and safety. Particularly, vehicles can utilize a radar system during autonomous or semi-autonomous operation to enable a vehicle control system to detect nearby vehicles, road boundaries, weather conditions, traffic signs and signals, and pedestrians, among other features within the environment surrounding the vehicle. For instance, radar may be used by an autonomous or semi-autonomous vehicle control system to avoid obstacles indicated by the sensor information. As the number of vehicle radar systems continues to grow, there is a desire for affordable radar units that can provide accurate measurements of a vehicle's environment.

Example embodiments presented herein include low-cost radar units that can mount at various positions and orientations on a vehicle to capture accurate measurements of the vehicle's environment. As an example, a radar unit may include a transmission array and a reception array with each array consisting of one or multiple antennas configured to transmit or receive radar signals in particular polarizations. Polarization represents a property applying to transverse waves (e.g., electromagnetic radar signals) that specifies the geometrical orientation of the oscillations. Linear polarization is the confinement of the electric field vector to a given plane along the direction of propagation. For example, if a radar signal is vertical (alternately up and down as the signal travels), the radiation is said to be vertical linear polarized.

By way of example, the presently disclosed polarizations may enable a radar unit to transmit (and receive) multiple signals that are orthogonal to one another. A signal is orthogonal to another if each signal is capable of being resolved independently of another signal. For example, if a radar unit is transmitting both vertically polarized and horizontally polarized signals, these signals may be orthogonal to each other. In practice, the two orthogonal that are transmitted may be reflected by objects in the environment. The radar unit may receive these signal reflections. The vertically polarized reflection signals may be received by a vertically polarized antenna. Similarly, the horizontally polarized reflection signals may be received by a horizontally polarized antenna. Because a vertically polarized signal is orthogonal to a horizontally polarized signal, a vertically polarized antenna will receive none (or a very small percentage) of a horizontally polarized signal and a horizontally polarized antenna may receive none (or a very small percentage) of a vertically polarized signal.

Some example embodiments describe radar units that are capable of radiating radar signals in multiple polarizations, such as horizontal linear polarization, vertical linear polarization, and slanted linear polarizations (e.g., approximately positive and negative forty-five degrees from the horizontal plane). For instance, the transmission array of an example radar unit may include a first transmission antenna configured to transmit radar signals that travel at a horizontal linear polarization and a second transmission antenna configured to transmit radar signals that travel at a vertical linear polarization. The transmission array may also include transmission antennas configured to transmit at slanted polarizations. For instance, the array can include an antenna configured to transmit radar signals at a first slanted polarization where the signals radiate at approximately positive forty-five degrees from a horizontal plane and an antenna configured to transmit radar signals at a second slanted polarization where the signals radiate at approximately negative forty-five degrees from the horizontal plane. As a result, the transmission array may transmit radar signals in four different polarizations to measure an environment.

The configuration, position, and orientation of a transmission antenna as well as the underlying waveguide channel can influence the polarization in which the antenna transmits radar signals, the width and distance of the transmission, and direction of operation of the transmission antenna. As such, different layouts of radar units are presented herein that depict radar units capable of various types of operation, including radar units capable of measuring objects at different ranges relative to the position of the radar unit. For instance, some radar units may operate as close range radar units configured to measurement aspects of the environment within a close range of the radar unit(s). Similarly, other radar units may be configured to operate as a mid-range and/or a far-range radar units. In further examples, radar units may be configured to measure different ranges depending on the power provided to the radar unit among other possible factors.

Example radar units may also include reception arrays consisting of one or multiple reception antennas configured to receive reflected radar signals that travel back to the radar unit at particular polarizations. For instance, the reception array may include four reception antennas that are each configured to receive reflected radar signals that are traveling in one of the four polarizations described above. The configuration, position, and orientation of a reception antenna can influence the polarization in which the antenna receives reflected radar signals, the width of reception, distance of reception, and direction of operation of the antenna.

In other embodiments, example radar units can have other configurations that include antennas configured to transmit and receive in multiple polarizations. For instance, a radar unit may include one or multiple transmission antennas configured to selectively transmit between multiple polarizations. As an example, a transmission antenna may be configured to selectively transmit radar signals that travel in either a vertical linear polarization or a horizontal linear polarization. Similarly, a transmission antenna may also be configured to selectively transmit between a first slanted polarization configured to radiate at approximately forty-five degrees from a horizontal plane and a second slanted polarization configured to radiate at approximately negative forty-five degrees from the horizontal plane.

Like the transmission antennas discussed above, some examples radar units may include reception antennas configured to receive reflected radar signals between multiple polarizations. This ability to selectively transmit or receive between multiple polarizations using a single antenna enables some example radar units presented herein to include less than four transmission or reception antennas while still being able to transmit or receive in four different polarizations. In some instances, a radar unit may include one or more antennas configured to transmit and receive radar signals in a particular polarization.

In further example embodiments, a radar unit may be configured to operate in fewer than four polarizations. For instance, the radar unit may be configured to transmit and/or receive in three polarizations, such as horizontal linear, vertical linear, and a slanted polarization configured to radiate at approximately negative forty-five degrees from the horizontal plane.

Radar units capable of operating in multiple polarizations can help reduce interference or jamming that may occur when multiple vehicles or devices use radar in the same area. Interference or jamming can cause a radar unit to receive radar signals that do not accurately represent the environment from the perspective of the radar unit. For instance, the radar unit positioned on a vehicle may receive unwantedly receive a radar signal that was transmitted in the same range and polarization by a radar system of a different vehicle. Further, all the different transmissions and reflections of radar signals can produce noise that impacts the performance of radar units.

Example radar units that can transmit and receive in more than one polarization can potentially circumvent jamming and interference by transmitting and receiving radar signals in polarizations that differ from the polarization used by nearby radar systems. In some examples, a radar system may switch polarization of radar signals in response to detecting potential interference from another radar system. For instance, a vehicle radar system may adjust polarization or use radar in multiple polarizations in response to detecting another vehicle and/or another radar system. In other examples, a radar system may use radar in one or multiple polarizations prior to detecting potential interference.

Likewise, a radar unit can transmit and attempt to receive radar signals in multiple polarizations (e.g., all four). The radar system may use the accumulation of measurements from the multiple polarizations to measure the environment. The combination of polarizations used by the radar unit can vary (e.g., all four at the same time, switch between 2 polarizations, etc.). Thus, a radar unit may be able to image a field of view of the radar unit in one or more polarizations.

Further, a radar unit operating in multiple polarizations can enable further analysis of an environment. For instance, the radar system can detect water (e.g., puddles and/or weather conditions) positioned on or nearby the roadway based on radar measurements in multiple polarizations. In some examples, the type of weather conditions detectable via radar can vary depending on the polarizations of radar used. Likewise, measurements of radar signals in multiple polarizations can assist in detecting metallic traffic signs, such as stop signs and street signs. For example, the radar signals reflecting off the edges of the metallic traffic signs in multiple polarizations can assist the radar system detect the location and estimate the boundaries of a sign. In some examples, a radar system may adjust polarization used by one or multiple radar units depending on desired aspects of the environment that the radar system may be instructed to measure.

The following detailed description may be used with an apparatus having one or multiple antenna arrays that may take the form of a single-input single-output single-input, multiple-output (SIMO), multiple-input single-output (MISO), multiple-input multiple-output (MIMO), and/or synthetic aperture radar (SAR) radar antenna architecture.

In some embodiments, radar antenna architecture may include "dual open-ended waveguide" (DOEWG) antennas. In some examples, the term "DOEWG" may refer herein to a short section of a horizontal waveguide channel plus a vertical channel that splits into two parts, where each of the two parts of the vertical channel includes an output port configured to radiate at least a portion of electromagnetic waves that enter the antenna. Additionally, multiple DOEWG antennas may be arranged into an antenna array. The radar unit architectures described herein may include multiple antenna arrays.

In some embodiments, radar unit architecture may consist of multiple layers (e.g., aluminum plates) that can be machined with computer numerical control (CNC), aligned properly, and joined together. For instance, a first layer may include a first half of an input waveguide channel, where the first half of the first waveguide channel includes an input port that may be configured to receive electromagnetic waves (e.g., 77 GHz millimeter waves) into the first waveguide channel.

The first layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The two or more layers may be assembled together to form a split-block assembly. Such antennas may be compact, efficient (i.e., there should be little 77 GHz energy lost to heat in the antenna, or reflected back into the transmitter electronics), and inexpensive and easy to manufacture.

In some examples, power dividing elements of the antenna architecture may be a two-dimensional or three-dimensional dividing network of waveguides. The dividing network of waveguides may use waveguide geometry to divide power. For example, the feed waveguides may have a predetermined height and width. The predetermined height and width may be based on a frequency of operation of the radar unit. The dividing network may include waveguides that differ in height and/or width from the predetermined height and width of the feed waveguides in order to achieve a desired taper profile.

Additionally, radar units may also include feed waveguides that provide a signal to radiating elements (i.e. antenna elements) may be divided between the top and bottom portions of the split-block assembly. Further, the feed waveguides may all be located in a common plane where the midpoint of the height of feed waveguides is common for all of the feed waveguides.

The dividing network of waveguides may be located partly in the same plane as the feed waveguides and partly in at least one other plane. For example, the entire height of a portion of the dividing network of waveguides may be machined into either the first or second portion of the split-block assembly. When the two block pieces are brought together, a surface of the other block portion may form an edge of the portion or the dividing network of waveguides that has its height fully in one of the two block sections. In some examples, the vertical portion of these waveguide cavities and cuts are symmetric with respect to the split block seam. When operating a waveguide system, various signals may be propagated through the waveguide system. The waveguide system may include a network of waveguides each with at least one antenna element on the top surface of the antenna block. Each antenna element may radiate a portion or all of the electromagnetic energy fed to it.

A waveguide is a structure that conducts electromagnetic energy from one location to another location. In some instances, conducting electromagnetic energy with a waveguide has the advantage of having less loss than other conduction means. A waveguide will typically have less loss than other conduction means because the electromagnetic energy is conducted through a very low loss medium. For example, the electromagnetic energy of a waveguide may be conducted through air or a low loss dielectric.

In one embodiment, such as an air-filled waveguide, the waveguide will have a metallic outer conductor. However, in other embodiments, the waveguide may be formed by only the dielectric medium through which the energy propagates. In either embodiment, the size and shape of the waveguide define the propagation of the electromagnetic energy. For example, electromagnetic energy may be contained within the metallic walls of waveguide. In other embodiments, a dielectric medium may fully contain the electromagnetic energy (such as fiber optic transmission).

Based on the shape and the materials of the waveguide, the propagation of the electromagnetic energy will vary. The shape and the materials of the waveguide define the boundary conditions for the electromagnetic energy. Boundary conditions are known conditions for the electromagnetic energy at the edges of the waveguide. For example, in the metallic waveguide, assuming the waveguide walls are nearly perfectly conducting, the boundary conditions specify that there is no tangentially directed electric field at any of the wall sides. Once the boundary conditions are known, Maxwell's Equations can be used to determine how electromagnetic energy propagates through the waveguide.

Maxwell's Equations will define several modes of operation for any given waveguide. Each mode defines one specific way in which electromagnetic energy can propagate through the waveguide. Each mode has an associated cutoff frequency. A mode is not supported in a waveguide if the electromagnetic energy has a frequency that is below the cutoff frequency. By properly selecting both (i) waveguide dimensions and (ii) frequency of operation, electromagnetic energy may propagate through the waveguide in a specific mode. Often, waveguides are designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the waveguide. However, a suffix number of zero indicates that there is no variation of the field with respect to that direction. For example, a $TE_{10}$ mode indicates the waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e. two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Example systems within the scope of the present disclosure will now be described in greater detail. An example system with which the radar units described herein may be used may be implemented in or may take the form of an automobile, a system to test radar capabilities of an automobile having radar, and any type of waveguide system. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other objects that use waveguides are possible to use example radar units presented herein.

In some examples, a vehicle radar system may include one or multiple adjustable radar units. For instance, a radar unit may be connected to a portion of a vehicle, removed, and reconnected to another portion of the vehicle. Further, in some instances, a radar unit may be part of a vehicle component. For example, a vehicle bumper, side mirrors, or other components of the vehicle may include radar units built therein.

FIG. 1A illustrates an assembled view of the top of radar unit 100. As shown, radar unit 100 includes first layer 110 and second layer 120 configured with numerous holes 112 (through-holes and/or blind-holes) that can enable use of alignment pins, screws, and other types of fasteners. In other examples, radar unit 100 may include more or fewer holes 112. In a further example, radar unit 100 may include no holes.

As indicated above, radar unit 100 includes first layer 110 and second layer 112. Both layers can exist in various types of materials, including polymers and metallic materials (e.g., metals, alloys, compounds). First layer 110 may include holes (not shown) that align with holes 112 of second layer 120. Second layer 120 can exist in various types of materials as well. As such, the two layers may join at a common plane (i.e. the two layers may be joined at a seam).

As shown in FIG. 1A, array 106 may represent an array of DOEWG radiating elements 102 and radiating slots 104. Array 106 can represent transmission antennas, reception antennas, or even a combination. The quantities and configurations of elements 102 and radiating slots 104 can vary. For instance, the quantities can depend on the number of DOEWGs and channels configured for radar unit 100. Radiating elements 102 of the DOEWG array may be a linear array (as shown), a two-dimensional array, a single element, or other configuration of radiating elements.

Radiating slots 104 represent features that can be machined into the top surface of radar unit 100. As such, the depth of each slot can vary. For example, one or more radiating slots 104 can have a depth that is less than the thickness of top layer 120 of radar unit 100. In other embodiments, the length, depth, position, spacing, and other parameters of radiating slots 104 can differ depending on desired performance of radiating slots 10 when radiating surface waves.

In some examples, elements 102 and radiating slots 104 are created through computer numerical control (CNC) machining of the surface of radar unit 100. Particularly, radiating slots 104 can be partially or fully filled with a dielectric material and can also have adjustable heights. For example, the height may be adjusted such that the height is zero, effectively removing one or more of radiating slots 104. Radiating slots 104 may be created in other ways as well.

Radar unit 100 includes transmission array 106 and reception array 108. Transmission array 106 includes one or more transmission antennas configured to transmit radar signals during operation of radar unit 100. Similarly, reception array 108 includes one or more reception antennas configured to receive reflected radar signals. By placing radiating slots 104 or other components near reception array 108, the receive characteristics of reception array 108 may be improved as well. Likewise, in other embodiments, radiating slots 104 can be positioned near transmission array 106 to enhance the transmission characteristics of the transmission antennas.

In some embodiments, the joining of first and second layers 110, 120 can result in an air gap or other discontinuity between mating surfaces of the two layers. In such embodiments, this gap or discontinuity may be proximate to (e.g. as close as possible to) a center of the length of the antenna apparatus and may have a size of about 0.05 mm or smaller, for example.

Figure 1B:
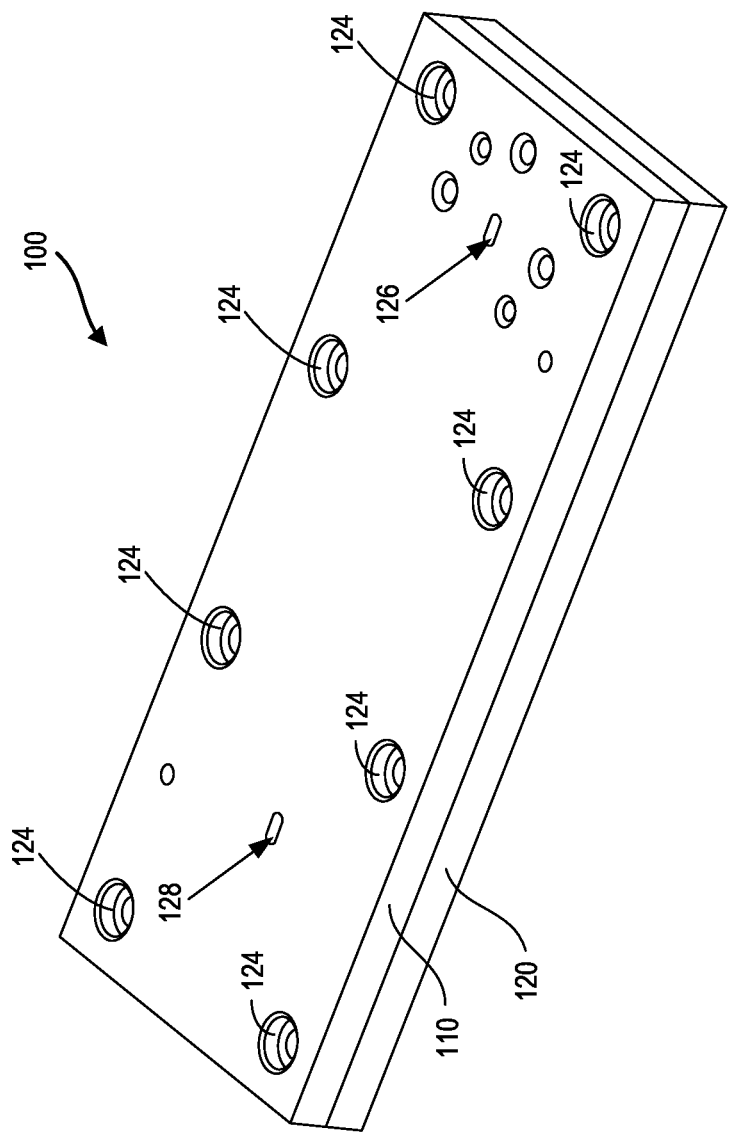
FIG. 1B illustrates an assembled view of the bottom of the radar unit, according to example embodiments.

FIG. 1B illustrates an assembled view of the bottom of radar unit 100. As shown, first layer 110 may include holes 124 (through-holes and/or blind-holes) configured to house alignment pins, screws, and the like. For instance, one or multiple holes 124 may align with corresponding holes in second layer 120. The bottom of radar unit 100 may couple to other components, such as a portion of a vehicle or device, or a processing system, etc.

As shown in FIG. 1B, radar unit 100 further includes ports 126, 128 that can enable radar unit 100 to receive electromagnetic waves in one or more waveguide channels located within radar unit 100. Ports 126, 128 can also direct electromagnetic waves for subsequent processing. As such, ports 126, 128 can permit bidirectional operation that transfers signals into and out of radar unit 100.

Figure 2A:
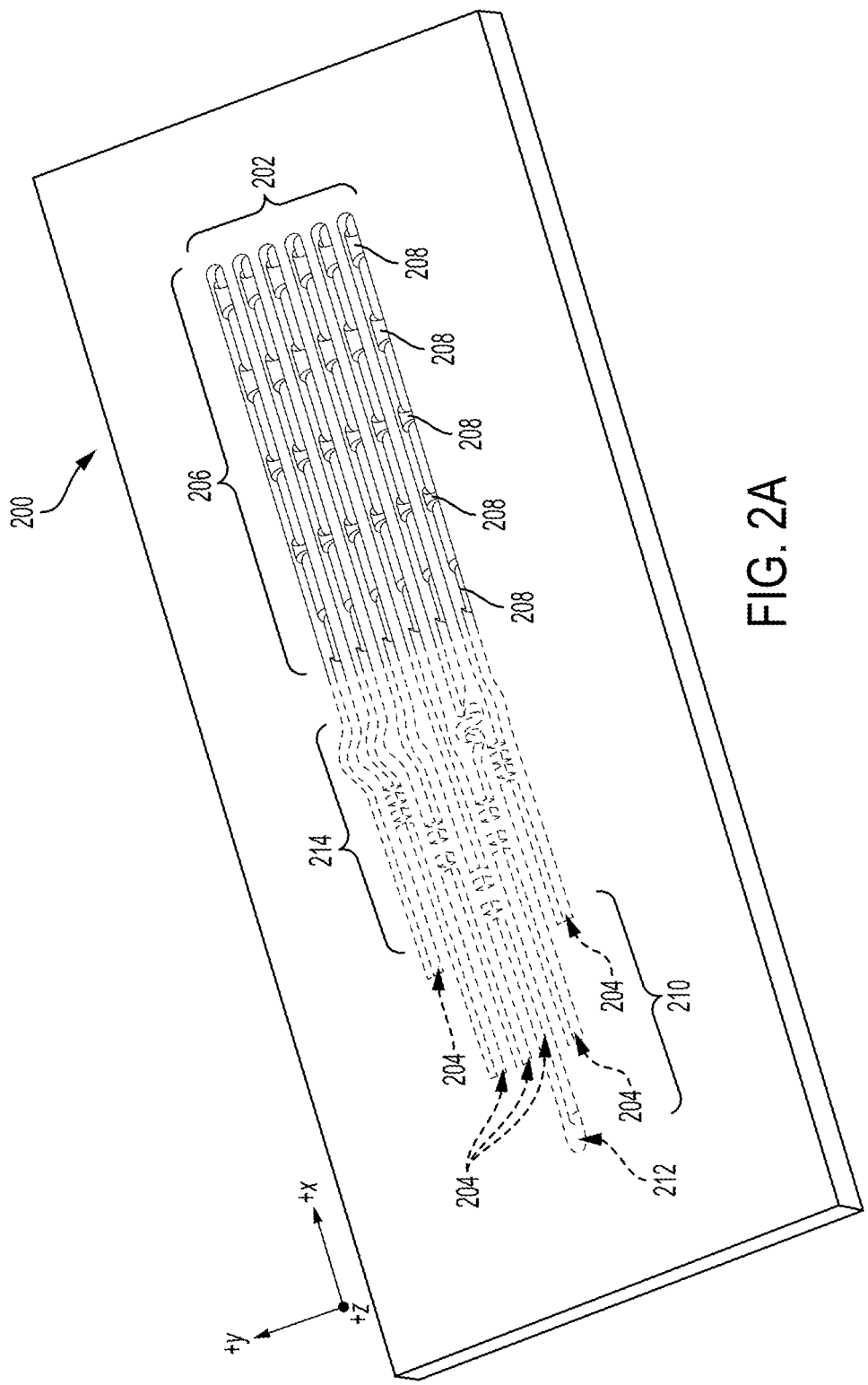
FIG. 2A illustrates an example first layer of a radar unit, according to example embodiments.
Figure 2B:
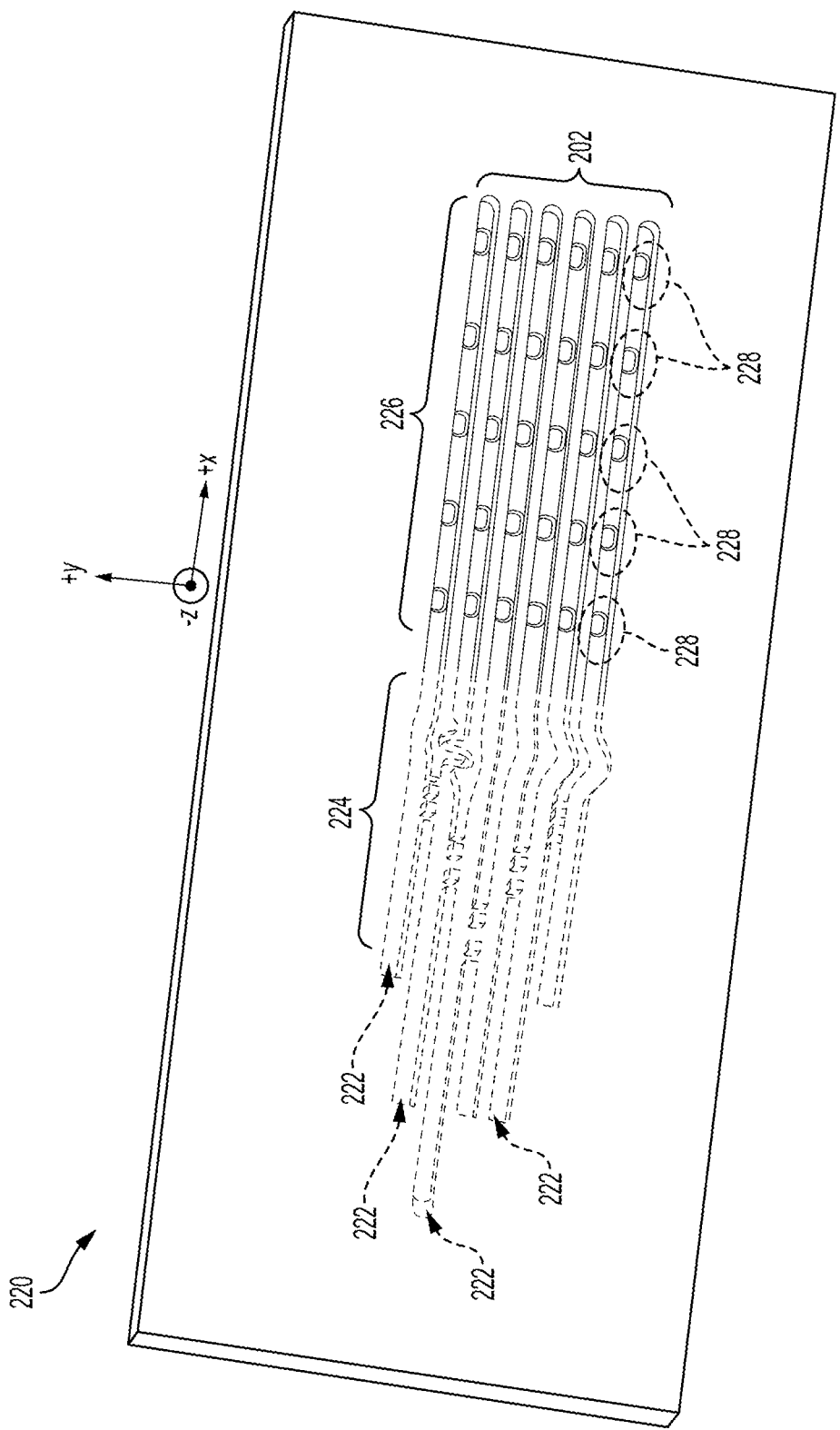
FIG. 2B illustrates an example second layer of a radar unit, according to example embodiments.

FIG. 2A illustrates first layer 200 of an antenna (e.g., radar unit 100). The dashed lines of the waveguide (used throughout) indicate the beamforming components of the feed waveguides. The example antenna of FIGS. 2A and 2B show a potential configuration for a beamforming network. As such, first layer 200 includes one or more waveguide channels 202 that include multiple elongated segments 204. At first end 206 of each elongated segment 204, a number of collinear wave-directing members 208 are positioned. The size and configurations of members 208 can differ. For instance, in some examples, members 208 can have a uniform configuration. In others, some members 208 can differ in size and configuration compared to other members 208.

At second end 210 of channels 202 positioned opposite first end 206, one or multiple elongated segments 204 can include through-hole 212 (i.e., input port). A given amount of power may be used to feed a corresponding amount of electromagnetic waves (i.e., energy) into the apparatus, and through-hole 212 may be the location where these waves are fed into the apparatus.

Upon entering the apparatus, the electromagnetic waves may generally travel in the +x direction, as shown, towards an array of power dividers 214 (i.e., a "beam-forming network"). Array 214 may function to divide up the electromagnetic waves and propagate respective portions of the waves to respective first ends 206 of each elongated segment 204. More specifically, the waves may continue to propagate in the +x direction after leaving array 214 toward wave-directing members 208. In line with the description above, array 214 section of the waveguide channels may be referred to herein as wave-dividing channels.

As the portions of the electromagnetic waves reach wave-directing members 208 at first end 206 of each elongated segment 204 of waveguide channels 202, wave-directing members 208 may propagate through respective sub-portions of the electromagnetic energy to a second half of the waveguide channels (i.e., in the +z direction, as shown). For instance, the electromagnetic energy may first reach a wave-directing member that is recessed, or machined further into the first layer 200 (i.e., a pocket). That recessed member may be configured to propagate a smaller fraction of the electromagnetic energy than each of the subsequent members further down first end 206, which may be protruding members rather than recessed members.

Further, each subsequent member may be configured to propagate a greater fraction of the electromagnetic waves travelling down that particular elongated segment 204 at first end 206 than the member that came before it. As such, the member at the far end of first end 206 may be configured to propagate the highest fraction of electromagnetic waves. Each wave-directing member 208 may take various shapes with various dimensions. In other examples, more than one member (or none of the members) may be recessed. Still other examples are possible as well. In addition, varying quantities of elongated segments are possible.

A second metal layer may contain a second half of the one or more waveguide channels, where respective portions of the second half of the one or more waveguide channels include an elongated segment substantially aligned with the elongated segment of the first half of the one or more waveguide channels and, at an end of the elongated segment, at least one pair of through-holes partially aligned with the at least one wave-directing member and configured to radiate electromagnetic waves propagated from the at least one wave-directing member out of the second metal layer.

Within examples, the elongated segment of the second half may be considered to substantially align with the elongated segment of the first half when the two segments are within a threshold distance, or when centers of the segments are within a threshold distance. For instance, if the centers of the two segments are within about ±0.051 mm of each other, the segment may be considered to be substantially aligned.

In another example, when the two halves are combined (i.e., when the two metal layers are joined together), edges of the segments may be considered to be substantially aligned if an edge of the first half of a segment and a corresponding edge of the second half of the segment are within about ±0.051 mm of each other.

In still other examples, when joining the two metal layers, one layer may be angled with respect to the other layer such that their sides are not flush with one another. In such other examples, the two metal layers, and thus the two halves of the segments, may be considered to be substantially aligned when this angle offset is less than about 0.5 degrees.

In some embodiments, the at least one pair of through-holes may be perpendicular to the elongated segments of the second half of the one or more waveguide channels. Further, respective pairs of the at least one pair of through-holes may include a first portion and a second portion. As such, a given pair of through-holes may meet at the first portion to form a single channel. That single channel may be configured to receive at least the portion of electromagnetic waves that was propagated by a corresponding wave-directing member and propagate at least a portion of electromagnetic waves to the second portion. Still further, the second portion may include two output ports configured as a doublet and may be configured to receive at least the portion of electromagnetic waves from the first portion of the pair of through-holes and propagate at least that portion of electromagnetic waves out of the two output ports.

FIG. 2B illustrates second layer 220 of radar unit 100. Second layer 220 may include a portion of waveguide channels 202 of first layer 200 shown in FIG. 2A (e.g., a second half of the input waveguide channel, the wave-dividing channels, and the wave-radiating channels). As shown, waveguide channels 202 may take on the general form of the first half of the channels, so as to facilitate proper alignment of the two halves of the channels. The elongated segments of the second half 222 may include second halves of the array of power dividers 224.

As described above, electromagnetic waves may travel through array 224, where they are divided into portions, and the portions then travel (i.e., in the +x direction, as shown) to respective ends 226 of the second halves of the elongated segments 222. Further, end 226 of a given elongated segment may include multiple pairs of through-holes 228, which may be at least partially aligned with the wave-directing members 208 of the first metal layer 200. More specifically, each pair of through-holes may be at least partially aligned with a corresponding wave-directing member, also referred to as a reflecting element, such that when a given sub-portion of electromagnetic waves are propagated from first layer 200 to second layer 220, as described above, those sub-portions are then radiated out of the pair of through-holes (i.e., a pair of output ports) in the −z direction, as shown. Again, the combination of a given wave-directing member and a corresponding pair of output ports may form a DOEWG, as described above.

Moreover, a combination of all the DOEWGs may be referred to herein as a DOEWG array. In antenna theory, when an antenna has a larger radiating aperture (i.e., how much surface area of the antenna radiates, where the surface area includes the DOEWG array) that antenna may have higher gain (dB) and a narrower beam width. As such, in some embodiments, a higher-gain antenna may include more channels (i.e., elongated segments), with more DOEWGs per channel. While the example antenna illustrated in FIGS. 2A and 2B may be suitable for autonomous-vehicle purposes (e.g., six elongated segments, with five DOEWGs per segment), other embodiments may be possible as well, and such other embodiments may be designed/machined for various applications, including, but not limited to, automotive radar.

For instance, in such other embodiments, an antenna may include a minimum of a single DOEWG. With this arrangement, the output ports may radiate energy in all directions (i.e. low gain, wide beamwidth). Generally, an upper limit of segments/DOEWGs may be determined by a type of metal used for the first and second metal layers. For example, metal that has a high resistance may attenuate an electromagnetic wave as that wave travels down a waveguide channel. As such, when a larger, highly-resistive antenna is designed (e.g., more channels, more segments, more DOEWGs, etc.), energy that is injected into the antenna via the input port may be attenuated to an extent where not much energy is radiated out of the antenna. Therefore, in order to design a larger antenna, less resistive (and more conductive) metals may be used for the first and second metal layers. For instance, in embodiments described herein, at least one of the first and second metal layers may be aluminum.

Further, in other embodiments, at least one of the first and second metal layers may be copper, silver, or another conductive material. Further, aluminum metal layers may be plated with copper, silver, or other low-resistance/high-conductivity materials to increase antenna performance. Other examples are possible as well.

The antenna may include at least one fastener configured to join the first metal layer to the second metal layer so as to align the first half of the one or more waveguide channels with the second half of the one or more waveguide channels to form the one or more waveguide channels (i.e., align the first half of the plurality of wave-dividing channels with the second half of the plurality of wave-dividing channels, and align the first half of the plurality of wave-radiating channels with the second half of the plurality of wave-radiating channels). To facilitate this in some embodiments, the first metal layer, a first plurality of through-holes (not shown in FIG. 2A) may be configured to house the at least one fastener. Additionally, in the second metal layer, a second plurality of through-holes (not shown in FIG. 2B) may be substantially aligned with the first plurality of through-holes and configured to house the at least one fastener for joining the second metal layer to the first metal layer. In such embodiments, the at least one fastener may be provided into the aligned first and second pluralities of through-holes and secured in a manner such that the two metal layers are joined together.

In some examples, the at least one fastener may be multiple fasteners. Mechanical fasteners (and technology used to facilitate fastening) such as screws and alignment pins may be used to join (e.g., screw) the two metal layers together. Further, in some examples, the two metal layers may be joined directly to each other, with no adhesive layer in between. Still further, the two metal layers may be joined together using methods different than adhesion, such as diffusion bonding, soldering, brazing, and the like. However, it is possible that, in other examples, such methods may be used in addition to or alternative to any methods for joining metal layers that are known or not yet known.

In some embodiments, one or more blind-holes may be formed into the first metal layer and/or into the second metal layer in addition to or alternative to the plurality of through-holes of the first and/or the second metal layer. In such embodiments, the one or more blind-holes may be used for fastening (e.g., housing screws or alignment pins) or may be used for other purposes.

Figure 2C:
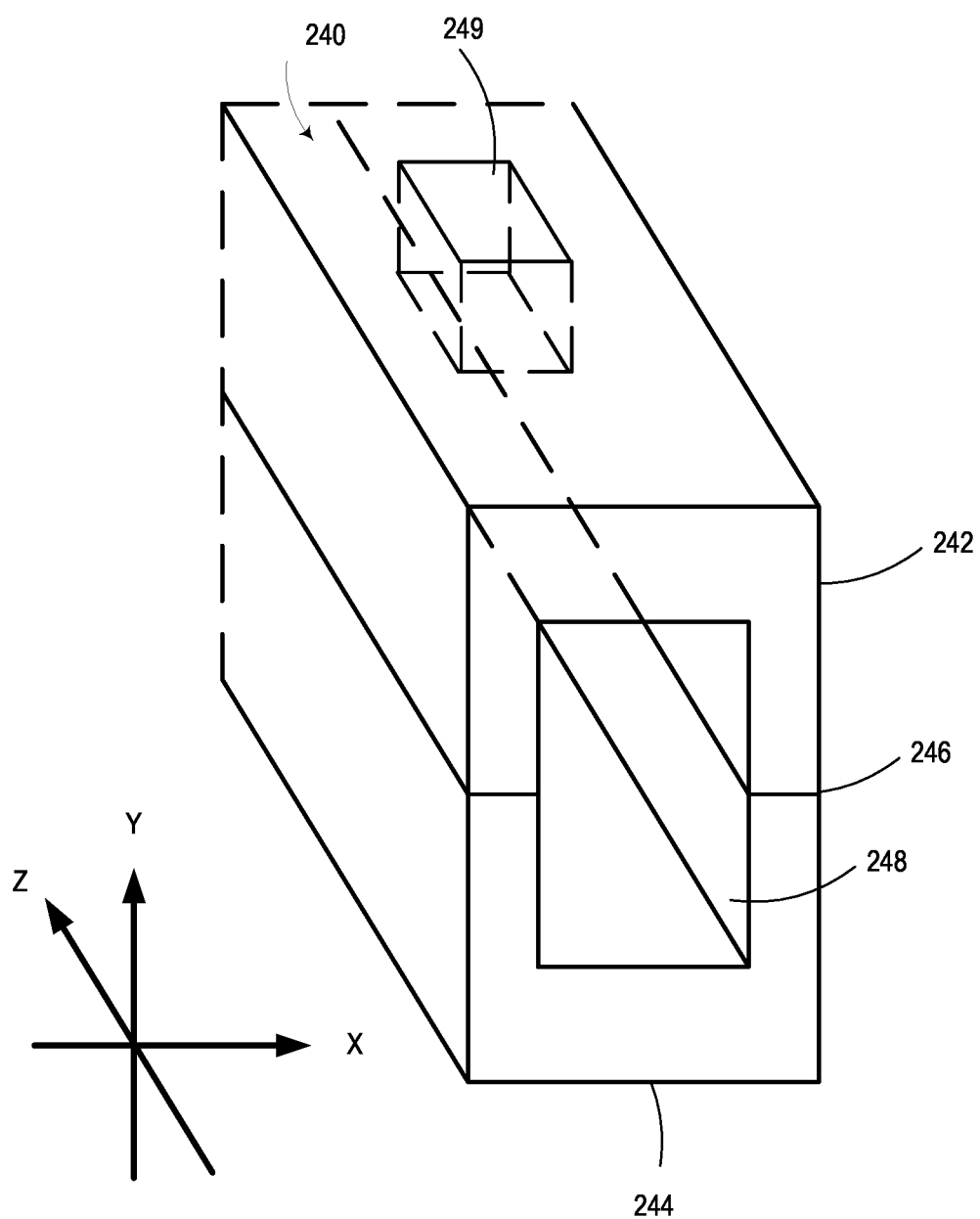
FIG. 2C illustrates an isometric cross-section view of a waveguide, according to example embodiments.

FIG. 2C illustrates an isometric cross-section view of waveguide 240. Waveguide 240 is formed with top portion 242 and bottom portion 244 coupled at seam 246. Waveguide further includes cavity 248 where electromagnetic energy propagate during operation of waveguide 240 and feed 249 configured to provide electromagnetic energy to cavity 248 or allow electromagnetic energy to exit waveguide 240. Although seam 246 is shown positioned at the middle point of the height of cavity 248, top portion 242 and bottom portion 244 can be coupled together at other positions along a given axis of waveguide 240.

Figure 3A:
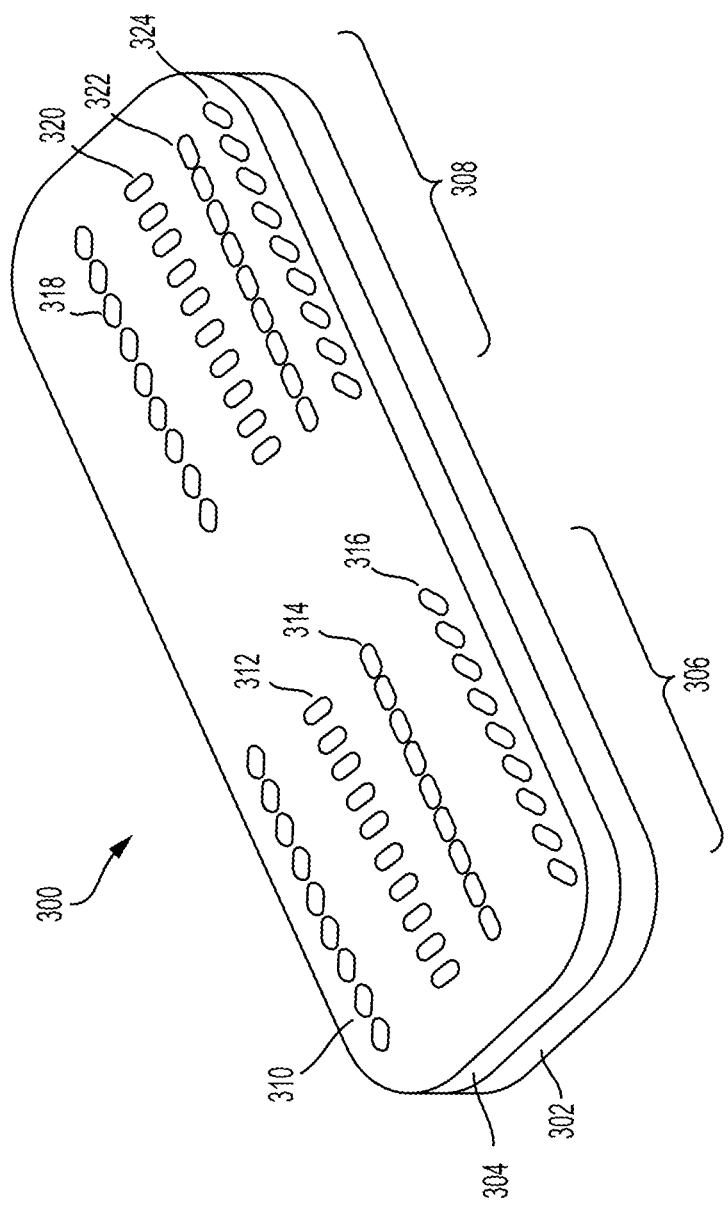
FIG. 3A illustrates an assembled view of the top of another radar unit, according to example embodiments.

FIG. 3A illustrates an assembled view of the top of radar unit 300. Radar unit 300 includes first layer 302 and second layer 304 coupled together. Second layer 304 includes transmission array 306 and reception array 308 with each having radiating elements making up transmission or reception antennas.

First layer 302 and second layer 304 may be generated out of various materials, such as aluminum, titanium, plastics, and alloys, among other possibilities. As such, first layer 302 and second layer 304 may house components of radar unit 300, including waveguides that enable operation of radiating elements in transmission array 306 and reception array 308. For example, the waveguides can be positioned in between first layer 302 and second layer 304.

Transmission array 306 includes radiating elements that make up transmission antennas 310, 312, 314, and 316. Each transmission antenna may transmit radar signals in a particular polarization. For instance, transmission antenna 310 may be configured to transmit radar signals that travel in a first polarization (e.g., positive 45 degrees from horizontal plane) and the other transmission antennas 312-316 may be configured to operate in the same or other polarizations (e.g., negative 45 degrees from horizontal plane, horizontal linear, and vertical linear). In other examples, some of the radiating elements may correspond to the same transmission antenna. For instance, radiating elements for transmission antenna 310 and transmission antenna 312 may combine to form a single transmission antenna.

Reception array 308 includes radiating elements that make up reception antennas 318, 320, 322, and 324. Each reception antenna may receive reflected radar signals that are traveling in a particular polarization. As an example, reception antennas 318-324 may each receive reflected radar signals from one of the four polarizations described above.

Transmission antennas 310-316 and reception antennas 318-324 may both utilize waveguides positioned within first layer 302 and second layer 304. Particularly, electromagnetic waves may travel along the waveguide channels and out as directed radar signals via transmission antennas 310-316. Likewise, electromagnetic waves in received radar signals may travel from reception antennas 318-324 through waveguides channels for subsequent processing.

In addition, the transmission antennas 310-316 and reception antennas 318-324 may be operated by a single radar chip of radar unit 300. In practice, the radar chip may be configured with a plurality of independent transmission and reception channels. Each channel corresponds to one signal the radar unit may be able to transmit and receive.

One example radar chip may have four receive channels and three transmit channels. Thus, the example chip may be able to transmit three signal and receive four signals simultaneously. Therefore, this example radar chip may be able to receive signals from all four polarizations of the radar unit simultaneous. Additionally, the example radar chip may be able to transmit three radar signals simultaneously. Therefore, in order for a radar unit to transmit with four different polarizations at once, the radar unit may be configured with (i) more than one radar chip or (ii) a way to divide one of the radar chip outputs into two transmission signals.

In some embodiments, radar unit 300 or other radar units described herein can further include an amplifier or another component configured to cause one or multiple transmission antennas to selectively transmit between two or more polarization channels. In one example, an amplifier may have a single input (such as from the radar chip) and two outputs. Each output of the radar chip may be selectively enabled or disabled. Therefore, a radar unit having a radar chip with three output may use an amplifier to split on of the three output signals into two signals. Thus, a signal radar chip with three output and an amplifier may be used to create four radar signals for transmitting by the radar unit.

Additionally, radar unit 300 can include other components, such as a control unit configured to selectively alter the transmission of the radar signal between the various polarizations available. For example, the control unit may be able to selectively enable between one and all four of the polarizations for transmission. In some examples, the control unit may be configured to iteratively change a transmitted polarization. Radar unit 300 may also include a processor configured to determine information regarding the environment based on incoming radar measurements. The processor may be positioned on radar unit 300 or coupled via a wired or wireless connection. In some examples, one or multiple processors may use measurements from radar unit 300 as well as other radar units to determine weather conditions of the surrounding environment. For instance, the processor or processors may use measurements of radar signals that radiated in multiple polarizations (e.g., two or more polarizations) to detect weather conditions as well as other features in the environment. In some further examples, the processor may use received radar information (or a lack of received radar information) to determine which polarizations to enable or disable. In further examples, radar unit 300 may include four reception antennas and three transmission antennas that are collocated on radar unit 300 as a single radar chip.

Figure 3B:
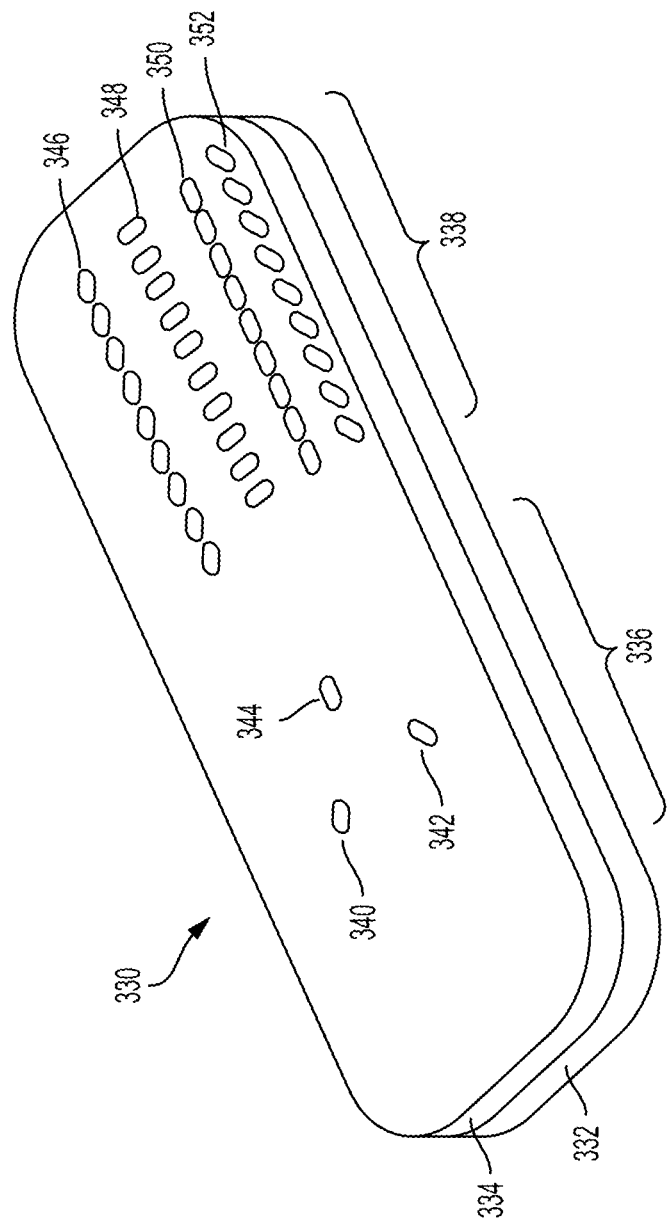
FIG. 3B illustrates an assembled view of the top of an additional radar unit, according to example embodiments.

FIG. 3B illustrates an assembled view of the top of radar unit 330. Similar to radar unit 300, radar unit 330 includes first layer 332 and second layer 334. Second layer 334 includes transmission array 336 and reception array 338 with each having radiating elements making up portions of transmission or reception antennas.

Transmission array 336 includes radiating elements that make up transmission antennas 340, 342, 344. Each transmission antenna may transmit radar signals in a particular polarization. As an example, transmission antennas 340 and 342 may transmit radar signals in slanted polarizations positive and negative forty-five degrees from a horizontal plane, respectively. In addition, transmission antenna 344 may transmit in a particular polarization, such as horizontal linear or vertical linear polarizations. In some embodiments, underlying waveguide channels may enable transmission antenna 344 (or another transmission antenna) to selectively transmit between multiple polarizations. For instance, transmission antenna 344 may selectively switch between transmitting radar signals that radiate in the horizontal linear polarization or vertical linear polarization.

Reception array 338 includes radiating elements that make up reception antennas 346, 348, 350, 352. Each reception antenna may receive reflected radar signals that are traveling in a particular polarization. As an example, reception antennas 346-352 may each receive reflected radar signals from one of the four polarizations described above. For instance, reception antenna 346 may receive reflected signals that are radiating in a slanted polarization. Underlying waveguide channels as well as other potential components may cause each reception antenna to receive radar signals radiating at particular polarizations. Further, the configuration (e.g., length, width) of the waveguide channel can influence the width of reception and distance that a reception antenna receives radar signals within.

Figure 3C:
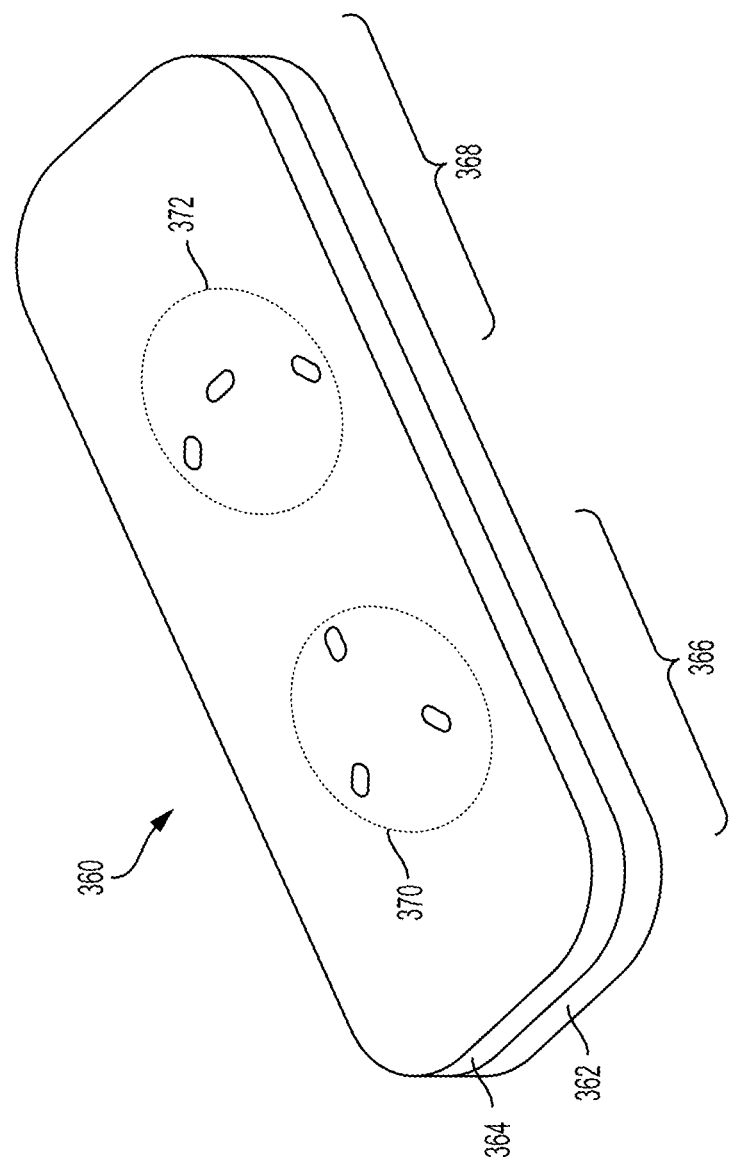
FIG. 3C illustrates an assembled view of the top of yet another radar unit, according to example embodiments.

FIG. 3C illustrates an assembled view of the top of radar unit 360. As shown, radar unit 360 is made up of first layer 362 and second layer 364 and further includes transmission array 366 and reception array 368. Transmission array 366 is made up of transmission antennas 370 and reception array 368 is made up of reception antennas 372. These antennas each include a single radiating element that may cause the antennas to transmit or receive from a wide range of the environment.

Radar units 300, 330, and 360 represent example configurations for radar units capable of operating in multiple polarizations. As such, other embodiments may involve radar units with different configurations. These configurations may enable a given radar unit to operate in more or less than four polarizations at a given time. These radar units as well as other radar units may be part of radar systems configured to assist vehicles or other devices measure an environment. As such, example radar units may include a processor or processors (e.g., computing system) that is/are configured to assist with object detection and identification. For instance, a processor may determine preliminary object identification based on one or multiple radar reflection transmission received from a radar transmission signal having a first polarization and also cause a transmission of a second radar signal having a second polarization different than the first polarization. As such, the processor may make an object identification based on a second received radar reflection transmission received from the transmission of the second radar signal.

Example radar units may also include control units that may correspond to the processors or other components. A given control unit may be configurable to cause transmission antennas to operate in a hybrid transmission mode. The hybrid transmission mode may involve one or more transmission antennas in selectively transmitting a radar signal simultaneously in two or more polarizations, such as horizontal linear polarization, vertical linear polarization, and slanted polarizations.

In a further example embodiment, a radar system may include transmission antennas that consist of a first transmission antenna configured to transmit in a horizontal linear polarization, a second transmission antenna configured to transmit in a vertical horizontal linear polarization, and a third transmission antenna configured to selectively transmit in between a first slanted polarization at approximately positive forty-five degrees from a horizontal plane and a second slanted polarization configured to radiate at approximate negative forty-five degrees from the horizontal plane. The radar system also includes reception antennas that consist of a first reception antenna configured to receive reflections of radar signals transmitted in the horizontal linear polarization, a second reception antenna configured to receive reflections of radar signals transmitted in the vertical horizontal linear polarization, a third reception antenna configured to receive reflections of radar signals transmitted in the first slanted polarization and a fourth reception antenna configured to receive reflections of radar signals transmitted in the second slanted polarization.

Figure 4A:
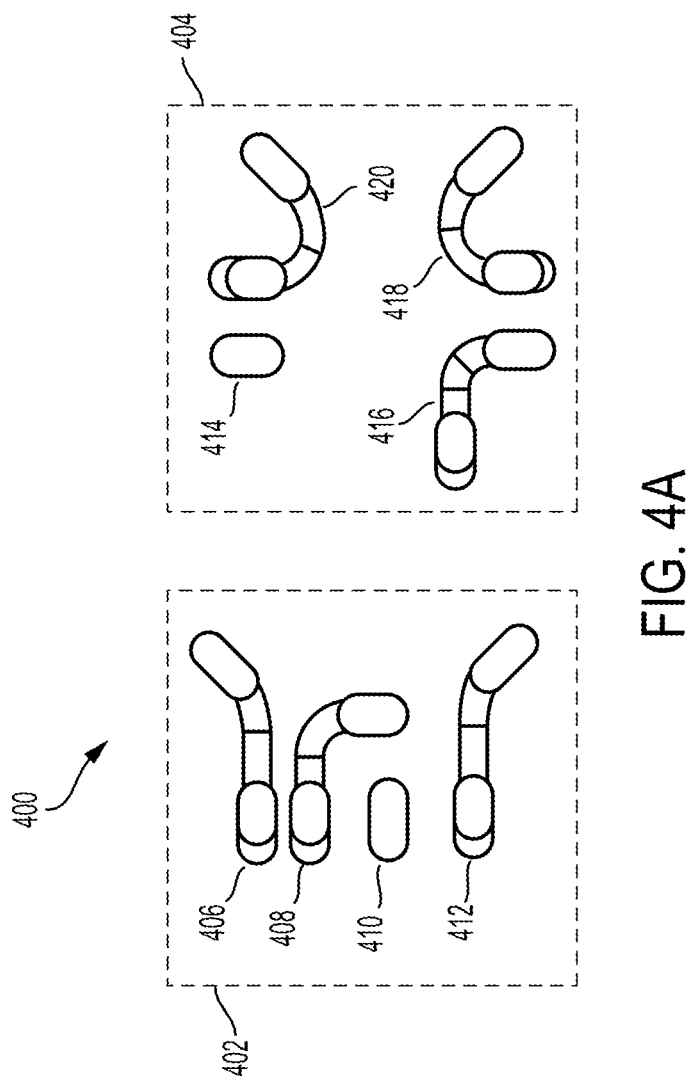
FIG. 4A illustrates a layout of transmission and reception antennas for a radar unit, according to example embodiments.

FIG. 4A illustrates layout 400 of transmission and reception antennas for a radar unit. As shown, layout 400 includes reception array 402 and transmission array 404. Reception array 402 includes reception antennas 406, 408, 410, and 412. Each reception antenna is configured to receive reflected radar signals from a particular polarization. For instance, reception antenna 406 may be configured to receive reflected radar signals at a slanted polarization, such as a slanted polarization at approximately negative forty-five degrees from a horizontal plane. Reception antenna 408 may be configured to receive reflected radar signals at a horizontal linear polarization and reception antenna 410 may be configured to receive reflected radar signals at a vertical linear polarization or another polarization. Reception antenna 412 may be configured to receive reflected radar signals at a slanted polarization, such as a slanted polarization at approximately positive forty-five degrees from the horizontal plane.

The length or configuration of the underlying waveguide can impact the performance of each reception antenna. As shown, reception antennas 406-412 have waveguides that are short in length compared to the waveguides of other antennas described herein. The length of these waveguides can influence that the degrees of reception that a given reception antenna may be designed to receive. In particular, the short length of waveguides for each reception antenna may signal that the reception antennas are configured to accept reflected signals from a wide area of focus.

As shown in FIG. 4, transmission array 404 includes transmission antennas 414, 416, 418, and 420. Each transmission antenna is configured to transmit radar signal at a particular polarization. For instance, transmission antenna 416 may be configured to receive reflected radar signals at a horizontal linear polarization and transmission antenna 414 may be configured to receive reflected radar signals at a vertical linear polarization. Further, transmission antenna 420 may be configured to receive reflected radar signals at a slanted polarization, such as a slanted polarization at approximately negative forty-five degrees from a horizontal plane. Similarly, transmission antenna 418 may be configured to receive reflected radar signals at a slanted polarization, such as a slanted polarization at approximately positive forty-five degrees from the horizontal plane.

Similar to the waveguides of reception antennas, the length or configuration of an underlying waveguide can impact the performance of transmission antenna. As shown, transmission antennas 414, 416, 418, and 420 have waveguides that are short in length compared to the waveguides of other antennas described herein. The length of these waveguides can influence that the beamwidth of transmission that a given transmission antenna array of the radar unit may transmit. In particular, the short length of an array may cause the transmission antennas to transmit signals outward over a wide area (i.e., wide beamwidth). Conversely, a long array may have a narrower beamwidth.

Figure 4B:
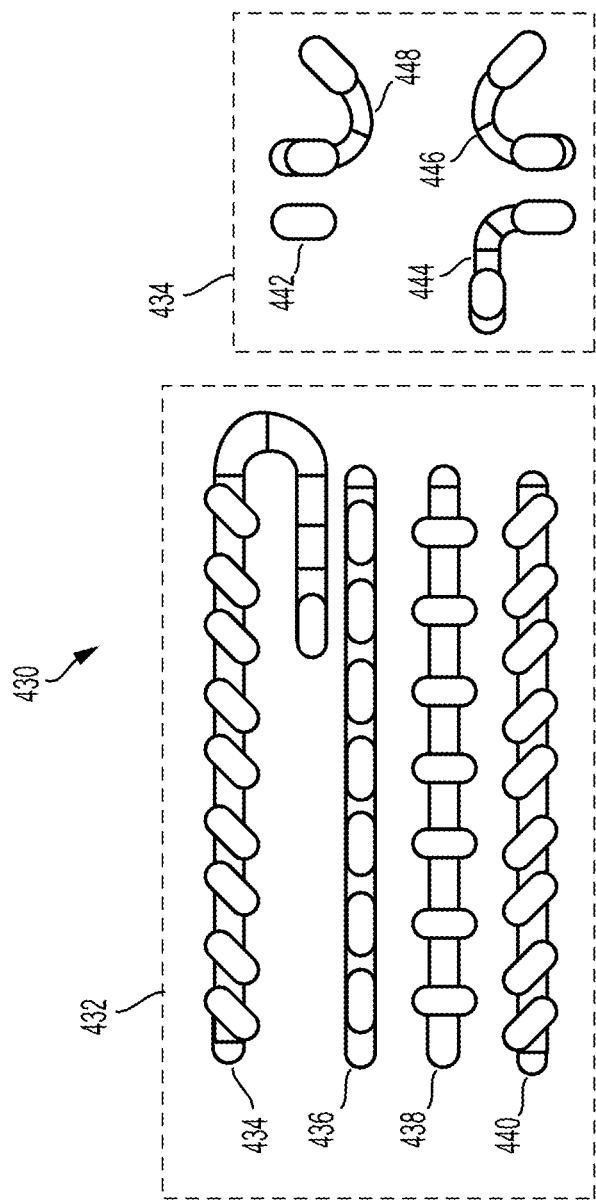
FIG. 4B illustrates another layout of transmission and reception antennas for a radar unit, according to example embodiments.

FIG. 4B illustrates another layout of transmission and reception antennas for a radar unit. Similar to layout 400, layout 430 includes reception array 432 and transmission array 434. In other embodiments, reception array 432 and transmission array 434 may switch configurations and positions of antennas.

Reception array 432 includes reception antennas 434, 436, 438, and 440. In some embodiments, reception antenna 434 and reception antenna 440 may both be configured to capture reflected radar signals at particular slanted polarizations, respectively. For example, reception antenna 434 may receive reflected radar signals at a slanted polarization, such as a slanted polarization at approximately positive forty-five degrees from the horizontal plane. In the example, reception antenna 440 may be configured to receive radar signals at a slanted polarization at approximately negative forty-five degrees from the horizontal plane.

Reception antenna 436 may be configured to receive radar signals traveling in the vertical linear polarization and reception antenna 438 may be configured to receive radar signals traveling in the horizontal linear polarization. In other embodiments, reception antenna 436 may be configured to receive reflected horizontal linear polarization signals and reception antenna 438 may be configured to receive reflected vertical linear polarization signals.

As discussed above, the length or configuration of the underlying waveguide can impact the performance of a reception antenna. As shown, reception antennas 434-440 all have waveguides that are long in length compared to the waveguides of other antennas described herein (e.g., waveguides of the transmission antennas of transmission array 434). The lengths or configurations of these waveguides can influence that the beamwidth of reception that a given reception antenna may be designed to receive. In particular, the long lengths of waveguides for each reception antenna may signal that the reception antennas are configured to accept reflected signals from a narrower beamwidth of reception. This narrower beamwidth can focus for reflected radar signals traveling over a narrow area towards the reception antenna.

Transmission array 434 in layout 430 includes a combination of transmission antennas 442, 444, 446, 448 that resemble the configuration of transmission array 404 depicted in FIG. 4A. Similar to transmission array 404, transmission antennas 442-448 in transmission array 434 may be configured to transmit wide beams of radar signals at particular polarizations.

Figure 4C:
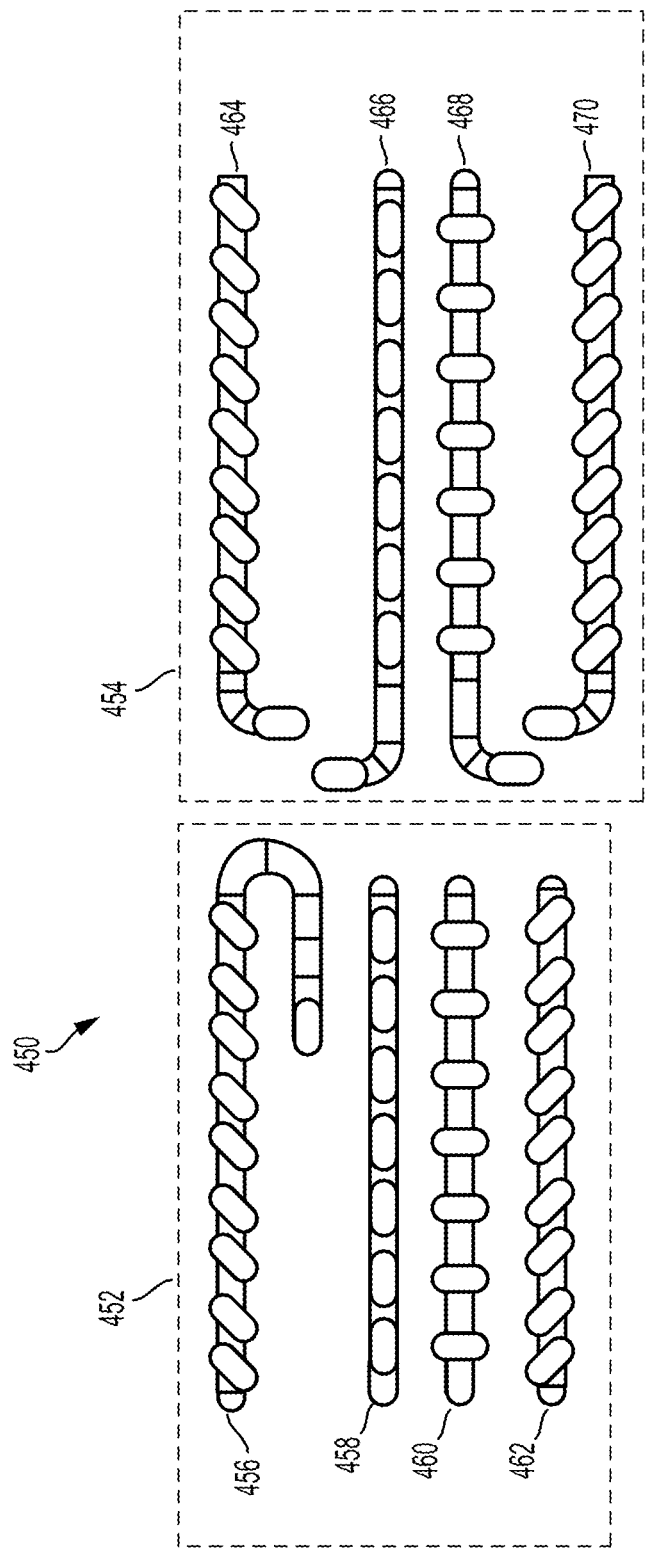
FIG. 4C illustrates a further layout of transmission and reception antennas for a radar unit, according to example embodiments.

FIG. 4C illustrates a further layout 450 of transmission and reception antennas for a radar unit. Layout 450 includes reception array 452 that resembles reception array 432 depicted in FIG. 4B.

Layout 450 also includes transmission array 454 that includes transmission antennas 464, 466, 468, and 470. As shown, transmission antennas 464-470 utilize long waveguides that can cause each transmission antenna to transmit radar signals that are narrow beams in focused directions. For instance, transmission antenna 464 may be configured to transmit radar signals in a narrow beam directed at a slanted polarization at approximately negative forty-five degrees from the horizontal plane. In other embodiments, transmission antenna 464 may transmit radar signals that travel in another polarization (e.g., horizontal linear).

In some embodiments, transmission antenna 466 and transmission antenna 468 may be configured to transmit radar signals towards a narrow focus of the environment. These transmitted radar signals may travel in particular polarizations, such as horizontal linear polarization and vertical linear polarization, respectively. Further, transmission antenna 470 may be configured to transmit radar signals in a narrow beam directed at a slanted polarization at approximately polarization forty-five degrees from the horizontal plane.

Figure 4D:
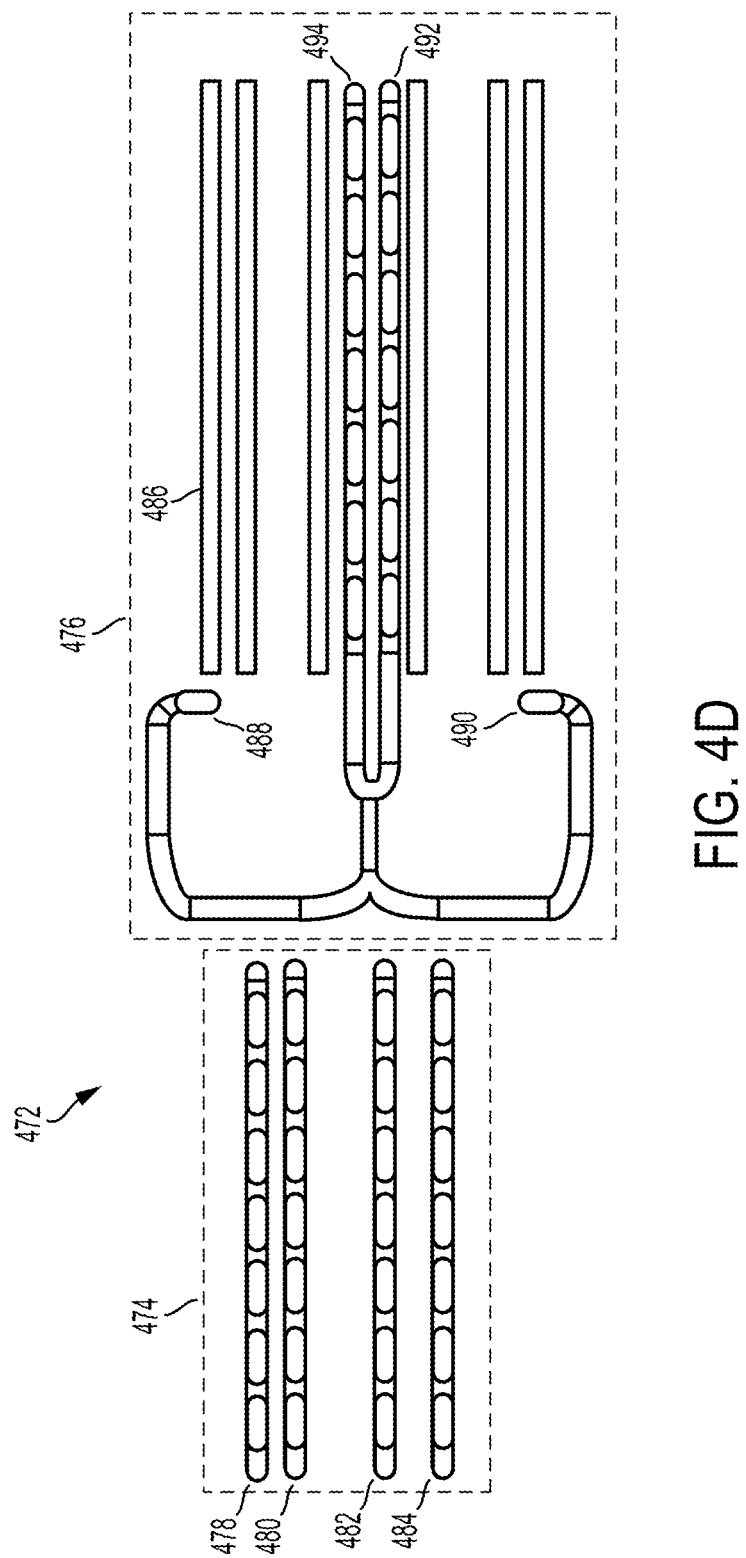
FIG. 4D illustrates an additional layout of transmission and reception antennas for a radar unit, according to example embodiments.

FIG. 4D illustrates an additional layout 472 of transmission and reception antennas for a radar unit. Layout 472 includes reception array 474 and transmission array 476. As shown in FIG. 4D, reception array 474 includes reception antennas 478, 480, 482, and 484 that may each be configured to receive reflected radar signals traveling towards the radar unit at particular polarizations. Similarly, transmission array 476 includes transmission antennas 488, 490, 492, and 494 linked via waveguide channels. Each of these transmission antennas may be configured to transmit radar signals that travel in a particular polarization in narrow beams due to the length of the antenna array. In addition, transmission array 476 also includes parasitic elements 486 that reduce energy loss and can improve operation of transmission antennas 488-494. In other embodiments, reception array 474 or other transmission/reception arrays discussed above may include one or multiple parasitic elements to enhance reception or transmission characteristics of the radar unit.

Figure 5:
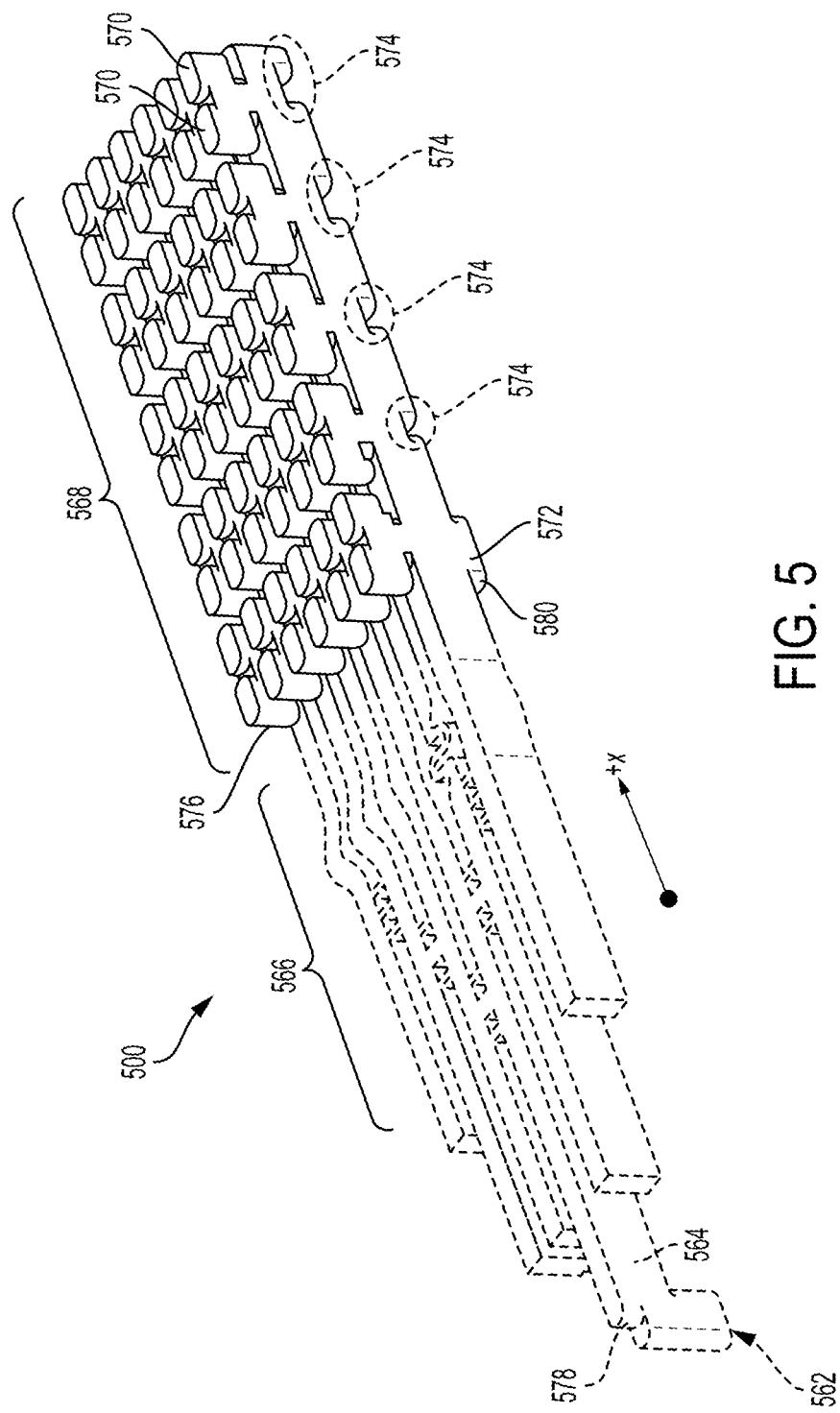
FIG. 5 illustrates conceptual waveguide channels formed inside an assembled antenna, according to example embodiments.

FIG. 5 illustrates conceptual waveguide channels 500 formed inside an assembled example antenna. More particularly, waveguide channels 500 represent the configuration of waveguide channels 202 of FIGS. 2A and 2B. For instance, waveguide channels 500 include input port 562 to input waveguide channel 564. Waveguide channels 500 also include wave-dividing channels 566 and multiple radiating doublets 568 (i.e., a DOEWG array).

As described above, when electromagnetic waves enter waveguide channels 500 at input port 562, the electromagnetic waves may travel in the +x direction through input waveguide channel 564 and then divided into portions by wave-dividing channels 566 (e.g., by power dividers). Those portions of electromagnetic waves may then travel in the +x direction to respective radiating doublets 568, where subportions of those portions are radiated out each DOEWG through pairs of output ports, such as radiating pair 570, for instance.

In a particular wave-radiating channel, a portion of electromagnetic waves may first be propagated through a first DOEWG with a recessed wave-directing member 572 (i.e., an inverse step, or "well"), as discussed above. This recessed wave-directing member 572 may be configured to radiate the smallest fraction of energy of all the members of the DOEWGs of the particular wave-radiating channel. In some examples, subsequent wave-directing members 574 may be formed (e.g., protruded, rather than recessed) such that each subsequent DOEWG can radiate a higher fraction of the remaining energy than the DOEWG that came before it. Phrased another way, each wave-directing member 572, 574 may generally be formed as a "step cut" into a horizontal (+x direction) channel (i.e., a wave-radiating channel, or the "first end" of an "elongated segment" as noted above) and used by the antenna to tune the amount of energy that is radiated vs. the amount of energy that is transmitted further down the antenna.

In some embodiments, a given DOEWG may not be able to radiate more than a threshold level of energy and may not be able to radiate less than a threshold level of energy. These thresholds may vary based on the dimensions of the DOEWG components (e.g., the wave-directing member, a horizontal channel, a vertical channel, a bridge between the two output ports, etc.), or may vary based on other factors associated with the antenna. In some embodiments, the first and second metal layers may be machined such that various sides of waveguide channels 500 have rounded edges, such as edge 576, 578, and 580, for example.

Figure 6:
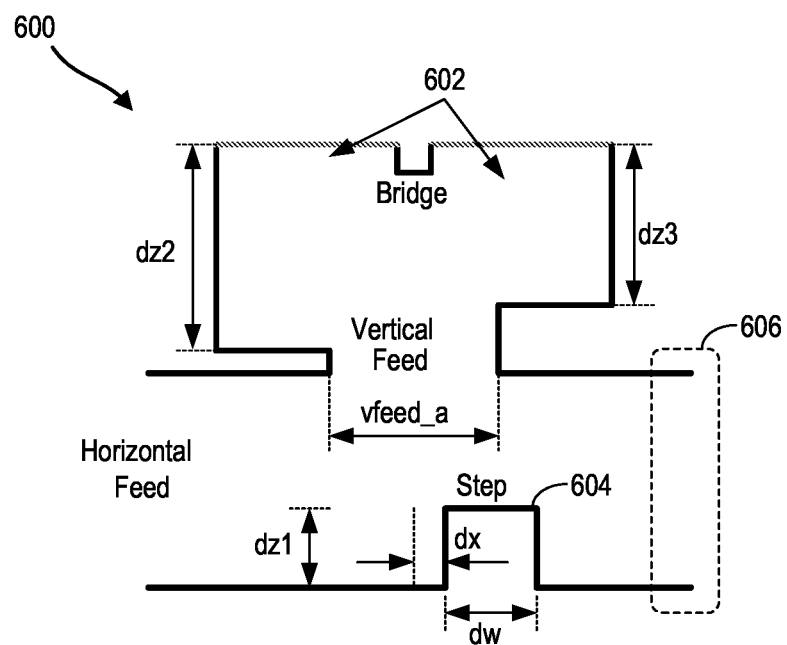
FIG. 6 illustrates a wave-radiating portion of an antenna, according to example embodiments.

FIG. 6 illustrates wave-radiating portion 600 of an example antenna. Wave-radiating portion 600 of FIG. 6 illustrates an example wave-radiating doublet of an example antenna. More specifically, FIG. 6 illustrates a cross-section of an example DOEWG 600. As noted above, a DOEWG 600 may include a horizontal feed (i.e., channel), a vertical feed (i.e. a doublet neck), and a wave-directing member 604. The vertical feed may be configured to couple energy from the horizontal feed to two output ports 602, each of which is configured to radiate at least a portion of electromagnetic waves out of the DOEWG 600. In some embodiments, the farthest DOEWG from the input port may include a backstop at location 606. The backstop may be an end or a termination of the respective waveguide. DOEWGs that come before the last DOEWG may simply be open at location 606 and electromagnetic waves may propagate through that location 606 to subsequent DOEWGs. For example, a plurality of DOEWGs may be connected in series where the horizontal feed is common across the plurality of DOEWGs. FIG. 6 shows various parameters that may be adjusted to tune the amplitude and/or phase of an electromagnetic signal that couples into the radiating element.

In order to tune a DOEWG such as DOEWG 600, the vertical feed width, vfeed_a, and various dimensions of the step 604 (e.g., dw, dx, and dz1) may be tuned to achieve different fractions of radiated energy out the DOEWG 600. The step 604 may also be referred to as a reflecting component as it reflects a portion of the electromagnetic waves that propagate down the horizontal feed into the vertical feed. Further, in some examples, the height dz1 of the reflecting component may be negative, that is may extend below the bottom of the horizontal feed. Similar tuning mechanisms may be used to tune the parasitic components as well. For example, the parasitic components may include any of the vertical width, and various dimensions of the height (e.g., dw, dx, and dz1).

In some examples, each output port 602 of the DOEWG 600 may have an associated phase and amplitude. In order to achieve the desired phase and amplitude for each output port 602, various geometry components may be adjusted. As previously discussed, the step (reflecting component) 604 may direct a portion of the electromagnetic wave through the vertical feed. In order to adjust amplitude associated with each output port 602 of a respective DOEWG 600, a height associated with each output port 602 may be adjusted. Further, the height associated with each output port 602 could be the height or the depths of this feed section of output port 602, and not only could be a height or depth adjustment but it could be a multiplicity of these changes or steps or ascending or descending heights or depths in general.

As shown in FIG. 6, height dz2 and height dz3 may be adjusted to control the amplitude with respect to two output ports 602. The adjustments to height dz2 and height dz3 may alter the physical dimensions of the doublet neck (e.g. vertical feed of FIG. 6). The doublet neck may have dimensions based on the height dz2 and height dz3. Thus, as the height dz2 and height dz3 are altered for various doublets, the dimensions of the doublet neck (i.e. the height of at least one side of the doublet neck) may change. In one example, because height dz2 is greater than height dz3, output port 602 associated with (i.e. located adjacent to) height dz2 may radiate with a greater amplitude than the amplitude of the signal radiated by output port 602 associated with height dz3.

Figure 7:
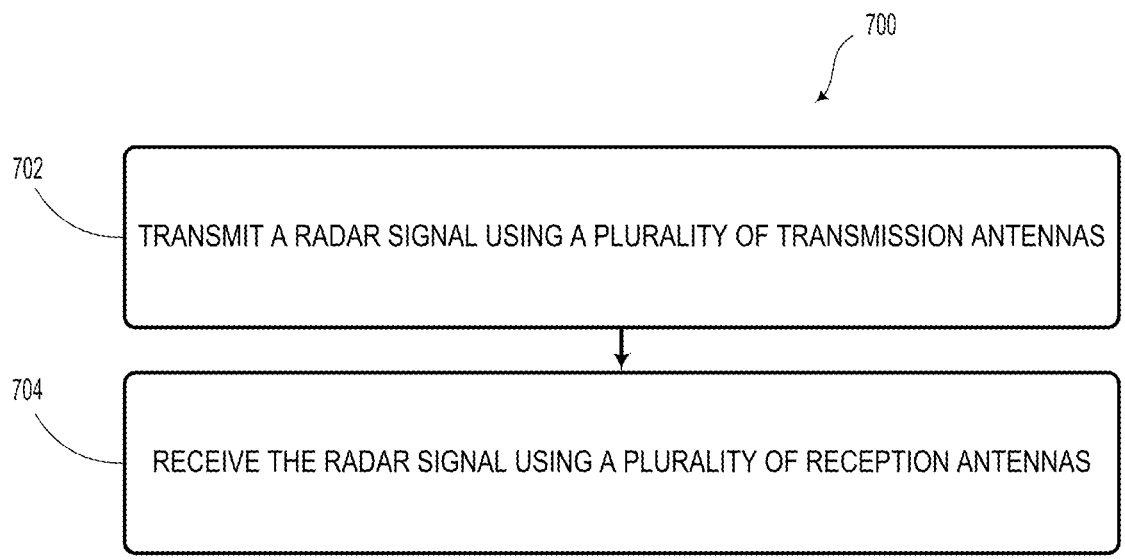
FIG. 7 is a flowchart depicting a method of signaling with a radar system, according to example embodiments using multi polarization antennas.

FIG. 7 is a flowchart depicting method 700 of signaling with a radar system. Method 700 may be performed using any of the example radar units or systems described above. Further, method 700 could be performed pseudo-inversely to receive electromagnetic waves (as opposed to radiate), in some embodiments. Method 700 may be performed to aid in navigation of an autonomous vehicle using a radar system mounted on the autonomous vehicle, for example. As discussed above, radar units can be mounted on various portions of a vehicle, including at different orientations. For example, a radar unit can couple to a vehicle in a vertical, horizontal, perpendicular, or otherwise different orientation depending on the desired performance of the radar unit. Coupling radar units to a vehicle may involve using various components. In other instances, radar units may be built in part of vehicle components. Alternatively, method 700 may be performed to communicate using radio communication techniques.

At block 702, method 700 involves transmitting a radar signal using a plurality of transmission antennas. For example, the plurality of transmission antennas can include transmission antennas configured to transmit in one of four polarizations.

As an example, the transmission antennas may include a set of three transmission antennas. A first transmission antenna may transmit radar signals that travel in a horizontal linear polarization and a second transmission antennas may transmit radar signals that travel in a vertical linear polarization. The set may further include a third transmission antenna configured to transmit radar signals selectively between two polarizations, such as a first slant polarization at approximately positive forty-five degrees from a horizontal plane and a second slant polarization at approximately negative forty-five degrees from the horizontal plane.

At block 704, method 700 includes receiving the radar using a plurality of reception antennas. The plurality of reception antennas can include transmission antennas configured to receive radar signals traveling in one of the four polarizations.

In some embodiments, method 700 may further involve receiving one or multiple radar signals transmitted selectively between at least two polarizations. The received radar signals can be used to determine weather conditions in the environment of the radar system. For example, a vehicle may perform navigation operations based on weather conditions detected using the radar system. As such, the vehicle control system may adjust control strategy when weather conditions are less suitable for safe navigation. In some instances, the vehicle control system can utilize the radar system to detect rain, snow, presence of puddles in the roadway, or other weather conditions that can impact navigation.

In additional embodiments, method 700 can further involve determining a preliminary object identification based on a first radar reflection transmission received from a first radar transmission having a first polarization. The embodiments may further involve causing a transmission of a second radar signal having a second polarization different than the first polarization and making an object identification based on a second received radar reflection transmission received from the transmission of the second radar signal.

In some embodiments, a transmission antenna of a radar system may transmit radar signals selectively between multiple polarizations. For instance, the transmission antenna may selectively transmit between a horizontal linear polarization and a vertical linear polarization. In other instances, a transmission antenna may selectively transmit radar signals between a first slanted polarization at approximately positive forty-five degrees from a horizontal plane a second slanted polarization configured to radiate at approximately negative forty-five degrees from the horizontal plane.

In further examples, a processor associated with a radar system may use radar signals to determine weather conditions. Particularly, the processor may determine weather conditions based on radar in multiple polarizations (e.g., at least two polarizations).

It should be understood that other shapes and dimensions of the waveguide channels, portions of the waveguide channels, sides of the waveguide channels, wave-directing members, and the like are possible as well. In some embodiments, a rectangular shape, or a rounded rectangular shape, of waveguide channels may be highly convenient to manufacture, though other methods known or not yet known may be implemented to manufacture waveguide channels with equal or even greater convenience.

Further, it should be understood that other layouts, arrangements, amounts, or sizes of the various elements illustrated in the figures are possible, as well. For example, it should be understood that a given application of an antenna or antenna system may determine appropriate dimensions and sizes for various machined portions of the polarization-rotating overlay unit cells illustrated in the figures (e.g., channel size, metal layer thickness, etc.) and/or for other machined (or non-machined) portions/components of the antenna(s) and antenna system(s) described herein. For instance, as discussed above, some example radar systems may be configured to operate at an electromagnetic wave frequency of 77 GHz, which corresponds to millimeter electromagnetic wave length. At this frequency, the channels, ports, etc. of an apparatus may be of given dimensions appropriated for the 77 GHz frequency. Other example antennas and antenna applications are possible as well.

Still further, the word "antenna" should not be limited to applications involving electromagnetic waves solely within radio frequencies of the electromagnetic spectrum. The term "antenna" is used herein broadly to describe a device that is capable of transmitting and/or receiving any electromagnetic wave. For example, any of the antennas or components of the antennas described herein could be capable of transmitting and/or receiving optical light. Even further, any of the antennas or components of the antennas described herein could be capable of being fed by optical sources (e.g., optical fibers or optical lasers). Such example antennas could be used as optical interconnects within a computing devices, for instance. In addition, corresponding shapes and dimensions of components within such antennas may vary depending on the wavelength (e.g., components used in optical embodiments may have feature sizes on the scale of hundreds of nanometers as opposed to millimeter feature sizes in radio embodiments).

It should be understood that arrangements described herein are for purposes of example only. As such, those skilled in the art will appreciate that other arrangements and other elements (e.g., machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A system comprising:
   an antenna structure comprising:
      a first antenna configured to transmit signals having a first polarization using electromagnetic energy from a first waveguide;
      a second antenna configured to transmit signals having a second polarization using electromagnetic energy from a second waveguide; and
      a third antenna configured to transmit signals having a third polarization using electromagnetic energy from a third waveguide,
      wherein each waveguide is electrically coupled to a source that is configured to provide the electromagnetic energy; and
   a control unit communicatively coupled to the antenna structure and configured to:
      based on first radar reflections having a given polarization indicating a vehicle is positioned in an environment, cause the antenna structure to transmit second radar signals having another polarization that is different from the given polarization.

2. The system of claim 1, wherein the first waveguide, the second waveguide, and the third waveguide are part of a beam forming network,
   wherein the beam forming network is configured to receive electromagnetic energy from the source and divide the electromagnetic energy among the first waveguide, the second waveguide, and the third waveguide.

3. The system of claim 1, wherein the antenna structure further comprises:
   a fourth antenna configured to receive signals in one or more polarizations.

4. The system of claim 3, wherein the antenna structure further comprises:
   a fifth antenna,
   wherein the fourth antenna is configured to receive signals in the first polarization, and
   wherein the fifth antenna is configured to receive signals in the second polarization.

5. The system of claim 4, wherein the first polarization is a vertical linear polarization and the second polarization is a horizontal linear polarization.

6. The system of claim 5, wherein the antenna structure further comprises:
   a sixth antenna configured to receive signals in the third polarization, wherein the third polarization is a slanted polarization.

7. The system of claim 1, wherein the antenna structure further comprises:
   an amplifier, wherein the amplifier is configured to cause the third antenna to selectively transmit between the third polarization and an at least a fourth polarization.

8. The system of claim 1, wherein the antenna structure further comprises:
   a set of reception antennas, wherein the first antenna, the second antenna, the third antenna, and the set of reception antennas are collocated on a single radar chip.

9. A method of signaling comprising:
causing, by a computing device, a radar unit to transmit a first plurality of radar signals having a first polarization in an environment, wherein the radar unit includes: (i) a first antenna configured to transmit radar signals having the first polarization using electromagnetic energy from a first waveguide, (ii) a second antenna configured to transmit radar signals having a second polarization using electromagnetic energy from a second waveguide, and (iii) a third antenna configured to transmit radar signals having a third polarization using electromagnetic energy from a third waveguide, wherein each waveguide is electrically coupled to a source that is configured to provide the electromagnetic energy;
receiving, at the computing device, a first plurality of radar reflections corresponding to the first plurality of radar signals having the first polarization;
detecting, based on the first plurality of radar reflections, a vehicle in the environment; and
based on detecting the vehicle in the environment, causing, by the computing device, the radar unit to transmit a second plurality of radar signals having the second polarization or the third polarization.

10. The method of claim 9, wherein receiving the first plurality of radar reflections corresponding to the first plurality of radar signals having the first polarization comprises:
receiving the first plurality of radar reflections from the radar unit, wherein the radar unit includes a fourth antenna configured to receive radar reflections having the first polarization.

11. The method of claim 9, wherein causing the radar unit to transmit the second plurality of radar signals comprises:
causing the radar unit to transmit the second plurality of radar signals having the second polarization; and
receiving a second plurality of radar reflections corresponding to the second plurality of radar signals.

12. The method of claim 11, wherein receiving the second plurality of radar reflections corresponding to the second plurality of radar signals comprises:
receiving the second plurality of radar reflections from the radar unit, wherein the radar unit includes a given antenna configured to receive radar reflections having the second polarization.

13. The method of claim 12, further comprising:
causing the radar unit to transmit a third plurality of radar signals having the third polarization; and
receiving a third plurality of radar reflections corresponding to the third plurality of radar signals.

14. A radar unit comprising:
a first antenna configured to transmit radar signals having a first polarization using electromagnetic energy from a first waveguide;
a second antenna configured to transmit radar signals having a second polarization using electromagnetic energy from a second waveguide;
a third antenna configured to transmit radar signals having a third polarization using electromagnetic energy from a third waveguide,
wherein each waveguide is electrically coupled to a printed circuit board (PCB) that is configured to provide the electromagnetic energy; and
a control unit configured to:
based on first radar reflections having a given polarization indicating a vehicle is positioned in an environment, cause the radar unit to transmit second radar signals having another polarization that is different from the given polarization.

15. The radar unit of claim 14, wherein the first waveguide, the second waveguide, and the third waveguide are part of a beam forming network, wherein the beam forming network is configured to receive electromagnetic energy from the PCB and divide the electromagnetic energy among the first waveguide, the second waveguide, and the third waveguide.

16. The radar unit of claim 14, further comprising:
a fourth antenna configured to receive radar reflections in one or more polarizations.

17. The radar unit of claim 16, further comprising:
an amplifier, wherein the amplifier is configured to cause the third antenna to selectively transmit between the third polarization and an at least a fourth polarization.

18. The radar unit of claim 17, wherein the first polarization is a vertical linear polarization, the second polarization is a horizontal linear polarization, the third polarization is a first slanted polarization at approximately positive forty-five degrees from a horizontal plane, and the at least the fourth polarization is a second slanted polarization at approximately negative forty-five degrees from the horizontal plane.

* * * * *